(12) United States Patent
Soto Matamala et al.

(10) Patent No.: US 10,474,727 B2
(45) Date of Patent: *Nov. 12, 2019

(54) APP RECOMMENDATION USING CROWD-SOURCED LOCALIZED APP USAGE DATA

(71) Applicant: APPLE INC., Cupertino, CA (US)

(72) Inventors: Leonardo A. Soto Matamala, Saratoga, CA (US); Ronald K. Huang, San Jose, CA (US); Lukas Marti, Santa Clara, CA (US); Xiaoyuan Tu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/360,156

(22) Filed: Nov. 23, 2016

(65) Prior Publication Data

US 2017/0075910 A1 Mar. 16, 2017

Related U.S. Application Data

(63) Continuation of application No. 13/842,724, filed on Mar. 15, 2013, now Pat. No. 9,510,141.

(Continued)

(51) Int. Cl.
*G06F 16/9537* (2019.01)
*H04W 4/21* (2018.01)
(Continued)

(52) U.S. Cl.
CPC ........ *G06F 16/9537* (2019.01); *G06F 16/248* (2019.01); *G06F 16/29* (2019.01);
(Continued)

(58) Field of Classification Search
CPC ......... H04W 8/18; H04W 4/02; H04W 4/206; H04W 4/021; H04W 12/02;
(Continued)

(56) References Cited

U.S. PATENT DOCUMENTS 7,526,458 B2  4/2009  Flinn et al.
8,005,680 B2  8/2011  Van Kommer
(Continued)

FOREIGN PATENT DOCUMENTS

AU  2013272113 A1  11/2014
AU  2013272113 B2   6/2016
(Continued)

OTHER PUBLICATIONS

CN2013800278472 , "Office Action", dated Apr. 1, 2017, 8 pages.
(Continued)

*Primary Examiner* — Robert W Beausoliel, Jr.
*Assistant Examiner* — Pedro J Santos
(74) *Attorney, Agent, or Firm* — Kilpatrick Townsend & Stockton LLP

(57) ABSTRACT

Applications may be tagged with location data when they are used. Mobile device may anonymously submit application usage data. Aggregated application usage data from many mobile devices may be analyzed to determine applications that are particularly relevant to a given location (i.e., exhibiting a high degree of localization). Analysis may include determining the application usage intensity, whether hotspots exist or not at a given location, the spatial entropy of a particular application, the device populations in a particular area, etc. Based on the localized application analysis, applications may be ranked according to local relevance, and, based on this ranking, application recommendations may be provided to a user.

22 Claims, 27 Drawing Sheets

Related U.S. Application Data

(60) Provisional application No. 61/655,427, filed on Jun. 4, 2012, provisional application No. 61/657,403, filed on Jun. 8, 2012, provisional application No. 61/699,705, filed on Sep. 11, 2012.

(51) Int. Cl.
*G06F 16/29* (2019.01)
*G06F 16/248* (2019.01)
*G06F 16/958* (2019.01)
*H04W 8/18* (2009.01)
*H04L 12/16* (2006.01)
*H04W 4/021* (2018.01)
*H04W 12/02* (2009.01)
*H04M 7/00* (2006.01)
*H04W 40/24* (2009.01)
*H04L 12/26* (2006.01)

(52) U.S. Cl.
CPC ............ *G06F 16/958* (2019.01); *H04L 12/16* (2013.01); *H04L 43/106* (2013.01); *H04M 7/0024* (2013.01); *H04W 4/021* (2013.01); *H04W 4/21* (2018.02); *H04W 8/18* (2013.01); *H04W 12/02* (2013.01); *H04W 40/242* (2013.01)

(58) Field of Classification Search
CPC .... H04W 40/242; H04L 12/16; H04L 43/106; H04M 7/0024; G06F 17/30038; G06F 17/30867; G06F 17/3089; G06F 17/30241; G06F 17/30554; G06F 21/62; G06F 2201/865; G06F 16/9537; G06F 16/958; G06F 16/248; G06F 16/29
USPC ........................ 707/E17.009, 999.107, 724
See application file for complete search history.

(56) References Cited

U.S. PATENT DOCUMENTS

| | | | |
|---|---|---|---|
| 8,311,967 B1 | 11/2012 | Lin et al. | |
| 8,428,622 B1 | 4/2013 | Zhang | |
| 8,559,931 B2 | 10/2013 | Moon et al. | |
| 9,195,721 B2 | 11/2015 | Soto Matamala et al. | |
| 9,267,805 B2 | 2/2016 | Marti et al. | |
| 9,402,161 B2 | 7/2016 | Marti et al. | |
| 9,510,141 B2 | 11/2016 | Soto Matamala et al. | |
| 9,529,500 B1 | 12/2016 | Gauci et al. | |
| 2004/0171379 A1 | 9/2004 | Cabrera et al. | |
| 2006/0156209 A1 | 7/2006 | Matsuura et al. | |
| 2007/0016373 A1 | 1/2007 | Hunter et al. | |
| 2007/0061735 A1 | 3/2007 | Hoffberg et al. | |
| 2008/0167078 A1 | 7/2008 | Eibye | |
| 2008/0167923 A1 | 7/2008 | Chowdhary et al. | |
| 2009/0060352 A1 | 3/2009 | Distante et al. | |
| 2009/0215497 A1 | 8/2009 | Louch | |
| 2010/0069035 A1 | 3/2010 | Johnson | |
| 2010/0076968 A1 | 3/2010 | Boyns et al. | |
| 2010/0261485 A1 | 10/2010 | Fernandes | |
| 2010/0306705 A1 | 12/2010 | Nilsson | |
| 2010/0318576 A1 | 12/2010 | Kim | |
| 2010/0331016 A1 | 12/2010 | Dutton et al. | |
| 2011/0035693 A1 | 2/2011 | Ueno et al. | |
| 2011/0055758 A1 | 3/2011 | Lukasiak et al. | |
| 2011/0093492 A1 | 4/2011 | Sull et al. | |
| 2011/0105150 A1 | 5/2011 | Moon et al. | |
| 2011/0119628 A1 | 5/2011 | Carter et al. | |
| 2011/0179449 A1 | 7/2011 | Ganesan et al. | |
| 2011/0307354 A1 | 12/2011 | Erman et al. | |
| 2011/0307478 A1 | 12/2011 | Pinckney et al. | |
| 2011/0320307 A1 | 12/2011 | Mehta et al. | |
| 2012/0021774 A1 | 1/2012 | Mehta et al. | |
| 2012/0036507 A1 | 2/2012 | Jonnala et al. | |
| 2012/0042036 A1 | 2/2012 | Lau et al. | |
| 2012/0095979 A1 | 4/2012 | Aftab et al. | |
| 2012/0101976 A1 | 4/2012 | Flinn et al. | |
| 2012/0110174 A1 | 5/2012 | Wootton et al. | |
| 2012/0134548 A1 | 5/2012 | Rhoads et al. | |
| 2012/0142369 A1 | 6/2012 | Hodges | |
| 2012/0258696 A1 | 10/2012 | Nam et al. | |
| 2012/0290434 A1 | 11/2012 | Moritz et al. | |
| 2012/0316955 A1 | 12/2012 | Panguluri et al. | |
| 2013/0024471 A1 | 1/2013 | Mitrovic | |
| 2013/0091452 A1 | 4/2013 | Sorden et al. | |
| 2013/0151148 A1 | 6/2013 | Parundekar et al. | |
| 2013/0290347 A1 | 10/2013 | Saib | |
| 2013/0325856 A1 | 12/2013 | Soto Matamala et al. | |
| 2013/0339345 A1 | 12/2013 | Soto Matamala et al. | |
| 2014/0012859 A1 | 1/2014 | Heilprin et al. | |
| 2014/0032678 A1 | 1/2014 | Koukoumidis et al. | |
| 2014/0101472 A1 | 4/2014 | Rohrweck | |
| 2014/0123022 A1 | 5/2014 | Lee et al. | |
| 2014/0141812 A1* | 5/2014 | Cho ................... H04W 4/022 455/456.3 |
| 2014/0194146 A1* | 7/2014 | Yarvis ................. G06Q 10/00 455/456.3 |
| 2014/0364149 A1 | 12/2014 | Marti et al. | |
| 2014/0364150 A1 | 12/2014 | Marti et al. | |
| 2015/0082242 A1 | 3/2015 | Antipa | |
| 2015/0088422 A1 | 3/2015 | Nikovski et al. | |
| 2015/0088662 A1 | 3/2015 | Noller et al. | |
| 2016/0029176 A1 | 1/2016 | Marti et al. | |
| 2016/0057569 A1 | 2/2016 | Soto Matamala et al. | |
| 2016/0357362 A1 | 12/2016 | Gauci et al. | |
| 2017/0013429 A1 | 1/2017 | Marti et al. | |
| 2017/0068408 A1 | 3/2017 | Gauci et al. | |

FOREIGN PATENT DOCUMENTS

| | | |
|---|---|---|
| CN | 101796803 | 8/2010 |
| CN | 102300205 | 12/2011 |
| CN | 104813316 | 7/2015 |
| DE | 112013002774 | 3/2015 |
| EP | 2523436 A1 | 11/2012 |
| JP | 2004152276 A | 5/2004 |
| WO | 2013184383 A2 | 12/2013 |
| WO | 2013184384 A2 | 12/2013 |
| WO | 2013184383 A3 | 5/2014 |
| WO | 2013184384 A3 | 6/2015 |
| WO | 2016196089 A1 | 12/2016 |

OTHER PUBLICATIONS

CN2013800278472, "Search Report", dated Mar. 24, 2017, 4 pages.
U.S. Appl. No. 14/928,581, "Non-Final Office Action", dated Sep. 14, 2017, 20 pages.
Non-Final Office Action dated Jan. 31, 2017 for U.S. Appl. No. 15/210,784, 10 pages.
U.S. Appl. No. 13/842,724, "Advisory Action", dated Nov. 27, 2015, 3 pages.
U.S. Appl. No. 13/842,724, "Final Office Action", dated Jul. 10, 2015, 31 pages.
U.S. Appl. No. 13/842,724, "Non-Final Office Action", dated Mar. 25, 2016, 35 pages.
U.S. Appl. No. 13/842,724, "Non-Final Office Action", dated Nov. 19, 2014, 23 pages.
U.S. Appl. No. 13/842,724, "Notice of Allowance", dated Jul. 22, 2016, 8 pages.
U.S. Appl. No. 13/843,291, "Notice of Allowance", dated Jul. 23, 2015, 7 pages.
U.S. Appl. No. 13/843,291, "Non-Final Office Action", dated Mar. 3, 2015, 15 pages.
U.S. Appl. No. 14/339,104, "Non-Final Office Action", dated Dec. 10, 2015, 9 pages.
U.S. Appl. No. 14/339,104, "Notice of Allowance", dated Mar. 29, 2016, 5 pages.
U.S. Appl. No. 14/732,359, "Final Office Action", dated Apr. 22, 2016, 32 pages.

(56) References Cited

OTHER PUBLICATIONS

U.S. Appl. No. 14/732,359, "Non-Final Office Action", dated Sep. 29, 2015, 28 pages.

U.S. Appl. No. 14/732,359, "Notice of Allowance", dated Sep. 12, 2016, 6 pages.

Australian Patent Application No. 2013272113, "First Examiner Report", dated Jun. 19, 2015, 3 pages.

Australian Patent Application No. 2013272113, "Notice of Acceptance", dated May 30, 2016, 3 pages.

Brandao, "Headphone Connect", Google play app, https://play.google.com/store/apps/detailsid=com.brandao.headphoneconnect&hl=en, downloaded Jun. 8, 2015, Sep. 5, 2014, 3 pages.

Paik, et al., "Applying Natural Language Processing (NLP) Based Metadata Extraction to Automatically Acquire User Preferences", In Proceedings of the 1st international conference on Knowledge capture, 2001, ACM, 2001, pp. 116-122.

Petzel, "Plug in Launcher", Google play app, https://play.google.com/store/apps/detailsid=com.launcher.plugin&hl=en, downloaded Jun. 8, 2015, Jul. 21, 2012, 2 pages.

Stanford Core NPL "The Stanford Natural Language Processing Group", Retrieved from the Internet: <URL: http://nlp.stanford.edu/software/corenlp.shtml>, Jul. 24, 2014, 6 pages.

Yan, et al., "Fast App Launching for Mobile Devices Using Predictive User Context", Jun. 25-29, 2012, 14 pages.

PCT/US2013/042483, "International Preliminary Report on Patentability", dated Dec. 18, 2014, 7 pages.

PCT/US2013/042483, "International Search Report and Written Opinion", dated Mar. 21, 2014, 10 pages.

PCT/US2013/042484, "International Preliminary Report on Patentability", dated May 21, 2015, 7 pages.

PCT/US2013/042484, "International Search Report and Written Opinion", dated Dec 4, 2014, 9 pages.

PCT/US2016/033952, "International Search Report and Written Opinion", dated Aug. 31, 2016, 16 pages.

\* cited by examiner $$G_\sigma(x,y) = \frac{1}{\sqrt{2\pi\sigma^2}} exp[-\frac{x^2+y^2}{2\sigma^2}]$$

$$LoG \triangleq \triangle G_\sigma(x,y) = \frac{\partial^2}{\partial x^2}G_\sigma(x,y) + \frac{\partial^2}{\partial y^2}G_\sigma(x,y) = \frac{x^2+y^2-2\sigma^2}{\sigma^4}e^{-(x^2+y^2)/2\sigma^2}$$

| Joint P(a, l) | | App a | | | | | |
|---|---|---|---|---|---|---|---|
| | | App 1 | App 2 | ... | App j | ... | App N |
| Location l | Location 1 | f_1,1 = Usage of App 1 @ Location 1 / Total usage | f_2,1 = Usage of App 2 @ Location 1 / Total usage | ... | ... | ... | ... |
| | Location 2 | f_1,2 = Usage of App 1 @ Location 2 / Total usage | f_2,2 = Usage of App 2 @ Location 2 / Total usage | ... | ... | ... | ... |
| | ... | ... | ... | ... | ... | ... | ... |
| | Location i | ... | ... | ... | f_ij = Usage of app j @ Location i / Total Usage | ... | ... |
| | ... | ... | ... | ... | ... | ... | ... |
| | Location N | ... | ... | ... | ... | ... | ... |
| Marginal Probabilities | | P(a_1) | P(a_2) | ... | P(a_j) | ... | ... |

$$h\_gji = -g\_ji * \text{Log}(g\_ji)$$

$$a\_1 : \sum h\_g1j$$

Where regional spatial entropy for each app can be expressed as: $ha1\_ai = \sum h\_gji$ and $g\_ji$ is the conditional probability of a location given an app.

FIG. 20A

$$\text{score} = \text{Usage}^{\alpha} * \left( \frac{F\_ij * \text{Log}(f\_ij)}{h\_a1\_aj * P(a\_j)} \right)^{\beta} * \text{Days\_Observed}^{\gamma}$$

FIG. 20B

APP RECOMMENDATION USING CROWD-SOURCED LOCALIZED APP USAGE DATA

RELATED APPLICATIONS

This application is a continuation of U.S. patent application Ser. No. 13/842,724 filed Mar. 15, 2013, which claims priority to U.S. Provisional Appl. No. 61/655,427, filed on Jun. 4, 2012, U.S. Provisional Appl. No. 61/657,403, filed on Jun. 8, 2012, and U.S. Provisional Appl. No. 61/699,705, filed on Sep. 11, 2012, the contents of which are incorporated by reference for all purposes.

BACKGROUND

The present disclosure generally relates to determining and providing app recommendation using crowd-sourced localized app usage data and more specifically to using crowd-sourced app usage data to provide relevant app recommendations to users of mobile devices based on location.

Mobile computing devices, such as smart phones, tablet computers, media players, portable computers, and the like, have become ubiquitous. People are ever more reliant on mobile devices for their day-to-day activities. Mobile devices can run software applications, or apps, designed to help users perform specific tasks. Users have a vast set of apps to choose from. For example, there are hundreds of thousands of apps available in the App Store℠. Apps have been downloaded and used by millions. The App Store℠ has provided billions of apps for download. Given the large number of apps available, it can be difficult for users to find the most useful apps.

Embodiments of the invention address this and other problems both individually and collectively.

SUMMARY

In some embodiments, applications, or apps, may be tagged with location data when they are used. Aggregated app usage data may be analyzed to determine apps that are particularly relevant to a given location (i.e., exhibiting a high degree of localization). Analysis may include determining the app usage intensity relative to other locations, whether hotspots exist or not at a given location, the spatial entropy of a particular app, the device population in a particular area, etc. Based on the localized app analysis, apps may be ranked according to local relevance, and app recommendations may be provided to a user based on the ranking. Privacy preserving rules and methods are provided for presenting users with location-based app recommendations in accordance with embodiments of the present invention. These and other embodiments of the present invention are described further below.

BRIEF DESCRIPTION OF THE DRAWINGS

FIG. 18 shows a sample table of joint probabilities based on usage intensity according to an embodiment of the present invention.

FIGS. 20A and 20B show equations for calculating entropy and ranking score according to an embodiment of the present invention

DETAILED DESCRIPTION OF THE INVENTION

Figure 1:
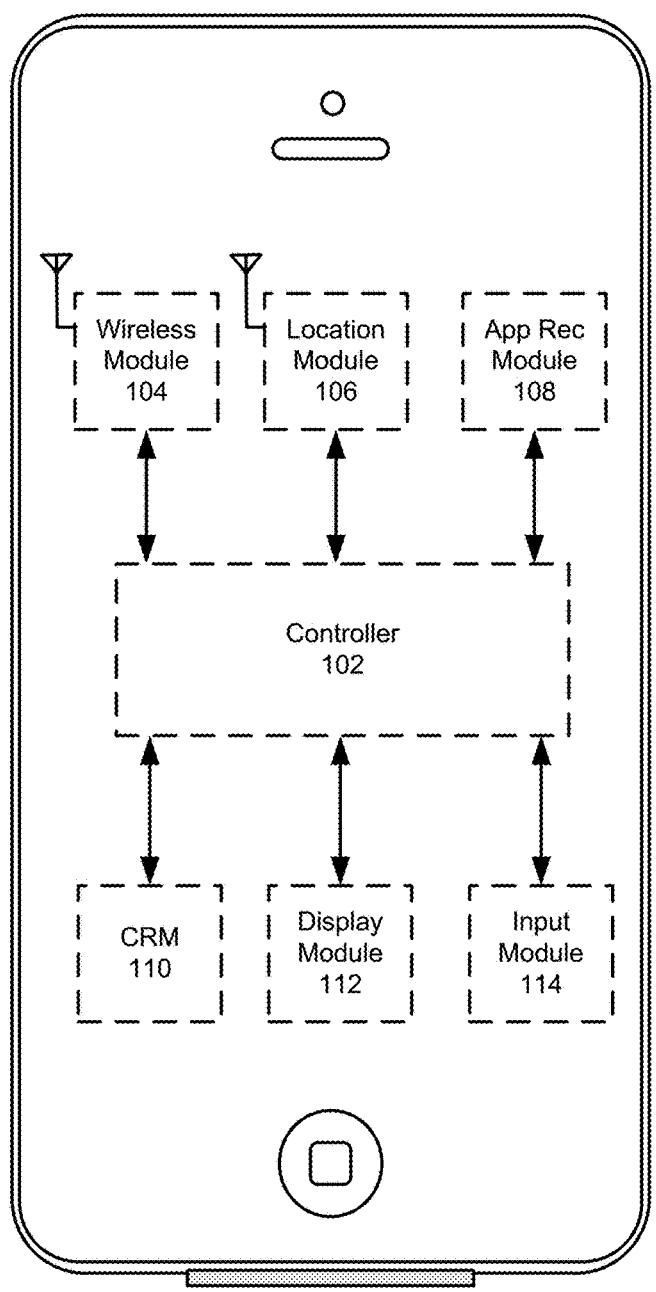
FIG. 1 is a high-level block diagram of a mobile device according to an embodiment of the present invention.

Given the vast set of apps that are available, it would be beneficial to analyze app usage data to identify app usage that is particularly relevant to given locations. Relevance can be defined with respect to a particular task or goal, or more generally to a given activity. App relevance can be defined as follows: an App Xi is relevant to a given activity Aj if Xi supports conducting activity Aj in a way that makes performing Aj possible, or faster, or easier, or more enjoyable, or it provides in a different way an improved user experience when performing Aj. Therefore, it would be beneficial to enable a user to discover apps that are relevant for the activities that the user needs to perform or is interested in. App usage data can be crowd-sourced for this purpose.

Often there is a link between spatio-temporal localization and relevance. That is, humans often exhibit a high degree of temporal and spatial regularity. For example, individuals are likely to visit a few highly frequented locations. Individuals may return to highly frequented locations because of the activities that are performed at the locations and/or the tasks being accomplished at the locations. Similarly, the time of day locations are frequented can relate to the activities that are performed at the locations and/or the tasks being accomplished at the locations. For example, restaurants are often frequented at meal times; gyms are visited to work out; offices are for working; libraries are for studying or research; etc. Based on these assumptions, app usage can be related to the activities that can be performed at a given location. Furthermore, by analyzing localized app usage, space-time localization of human activities (some areas may exhibit different popular activities at different times of the day) can be identified. Therefore, some embodiments of the present invention enable the user to find apps that are relevant to specific locations.

App usage data, for example uses or downloads of an app, can be tagged with location and/or time information and crowd-sourced from a plurality of mobile devices. A localized app recommendation engine may identify apps that are statistically relevant to particular locations (e.g., locations where the apps have "hotspots" for usage). Once app hotspots have been identified, app recommendations can be provided to users of mobile devices based on the current location of the mobile device or another specified location. App recommendation can be triggered in a number of ways, and once triggered can be presented to the user in various ways. For example, a user could enter a predetermined radius of an identified hotspot for a particular application and a notification for that application can automatically be displayed on the user's mobile device. In another example, the user may request apps, overtly or otherwise, that are relevant to a particular location (e.g., apps that are relevant to the final destination specified in a maps app, apps that are relevant to the current location, etc.).

These and other embodiments will be described further below after example mobile devices and systems are described in the following section.

I. Mobile Device and System

FIG. 1 shows a high-level block diagram of a mobile device 101. It will be further appreciated that the device shown in FIG. 1 is illustrative and that variations and modifications are possible. Mobile device 101 can include a controller 102, a wireless module 104, a location module 106, app recommendation module 108, a computer-readable medium (CRM) 110, a display module 112, and an input module 114. Mobile device 101 can include additional modules. In some embodiments, mobile device 101 can be a sufficient size, dimension, and weight to enable the device to be easily moved by a user. For example, mobile device 101 can be pocket size.

Controller 102, which can be implemented as one or more integrated circuits, can control and manage the overall operation of mobile device 101. For example, controller 102 can perform various tasks, such as retrieving various assets that can be stored in CRM 110, accessing the functionalities of various modules (e.g., interacting with other Bluetooth®-enabled devices via a Bluetooth® module), executing various software programs (e.g., operating systems and applications) residing on CRM 110, and so on. In some embodiments, controller 102 can include one or more processors (e.g., microprocessors or microcontrollers) configured to execute machine-readable instructions. For example, controller 102 can include a single chip applications processor. Controller 102 can further be connected to CRM 110 in any suitable manner.

Wireless module 104 can include any suitable wireless communication technology. For example, wireless module 104 could include a Bluetooth® module, a radio frequency (RF) module, a WiFi module, and/or the like. The Bluetooth® module can include any suitable combinations of hardware for performing wireless communications with other Bluetooth® enabled devices and allows an RF signal to be exchanged between controller 102 and other Bluetooth®-enabled devices. In some embodiments, a Bluetooth® module can perform such wireless communications according to Bluetooth® Basic Rate/Enhanced Data Rate (BR/EDR) and/or Bluetooth® Low Energy (LE) standards. The Bluetooth® protocol, in general, enables point-to-point wireless communications between multiple devices over short distances (e.g., 30 meters). Bluetooth® has gained widespread popularity since its introduction and is currently used in a range of different devices. In order to allow Bluetooth® to be used in a greater variety of applications, a low energy variant of the technology was introduced in the Bluetooth® Core Specification, Version 4.0. Bluetooth® Low Energy (LE), in general, enables devices to wirelessly communicate while drawing low amounts of power. Devices using Bluetooth® LE can often operate for more than a year without requiring their batteries to be recharged.

For example, a Bluetooth® module can include suitable hardware for performing device discovery, connection establishment, and communication based on only Bluetooth® LE (e.g., single mode operation). As another example, a Bluetooth® module can include suitable hardware for device discovery, connection establishment, and communication based on both Bluetooth® BR/EDR and Bluetooth® LE (e.g., dual mode operation). As still another example, a Bluetooth® module can include suitable hardware for device discovery, connection establishment, and communication based only on Bluetooth® BR/EDR.

An RF module can include any suitable combinations of hardware for performing wireless communications with wireless voice and/or data networks. For example, an RF module can include an RF transceiver that enables a user of mobile device 101 to place telephone calls over a wireless voice network.

A WiFi module can include any suitable combinations of hardware for performing WiFi-based communications with other WiFi-enabled devices. For example, a WiFi module may be compatible with IEEE 802.11a, IEEE 802.11b, IEEE 802.11g and/or IEEE 802.11n.

Location module 106 can include any suitable location technology using one or more wireless signals to determine a current location. In some embodiments, location module 106 includes a global positioning system (GPS) module. In some embodiments, location module 106 includes one or more of the following: WiFi location module, cellular location module, crowd-sourced WiFi location module, time of flight calculations (ToF) location module, and the like.

App recommendation module 108 can include code that, when executed, determines or provides an app recommendation to the user based on a location. For example, the user can request app recommendations for a particular location. In another example, a notification regarding a locally relevant app could be provided based on the mobile device's current location. App rec module 108 can also perform device-side collection and aggregation of app usage data for crowd-sourcing.

CRM 110 can be implemented, e.g., using disk, flash memory, random access memory (RAM), hybrid types of memory, optical disc drives or any other storage medium that can store program code and/or data. CRM 110 can store software programs that are executable by controller 102, including operating systems, applications, and related program code (e.g., code for app rec module 108).

Software programs (also referred to as software or apps herein) can include any program executable by controller 102. In some embodiments, certain software programs can be installed on mobile device 101 by its manufacturer, while other software programs can be installed by a user. Examples of software programs can include operating systems, navigation or other maps applications, locator applications, productivity applications, video game applications, personal information management applications, applications for playing media assets and/or navigating a media asset database, applications for controlling a telephone interface to place and/or receive calls, and so on. Although not specifically shown, one or more application modules (or set of instructions) may be provided for launching and executing one or more applications, e.g., various software components stored in medium 110 to perform various functions for mobile device 101.

Display module 112 can be implemented using any suitable display technology, including a CRT display, an LCD display (e.g., touch screen), a plasma display, a direct-projection or rear-projection DLP, a microdisplay, and/or the like. In various embodiments, display module 112 can be used to visually display user interfaces, images, and/or the like.

Input module 114 can be implemented as a touch screen (e.g., LCD-based touch screen), a voice command system, a keyboard, a computer mouse, a trackball, a wireless remote, a button, and/or the like. Input module 114 can allow a user to provide inputs to invoke the functionality of controller 102. In some embodiments, input module 114 and display module 112 can be combined or integrated. For example, mobile device 101 can include an LCD-based touch screen that displays images and also captures user input. Illustratively, a user can tap his or her finger on a region of the touch screen's surface that displays an icon. The touch screen can capture the tap and, in response, start a software program associated with the icon. Upon starting the software program, a graphical user interface for the application can be displayed on the touch screen for presentation to the user.

Figure 2:
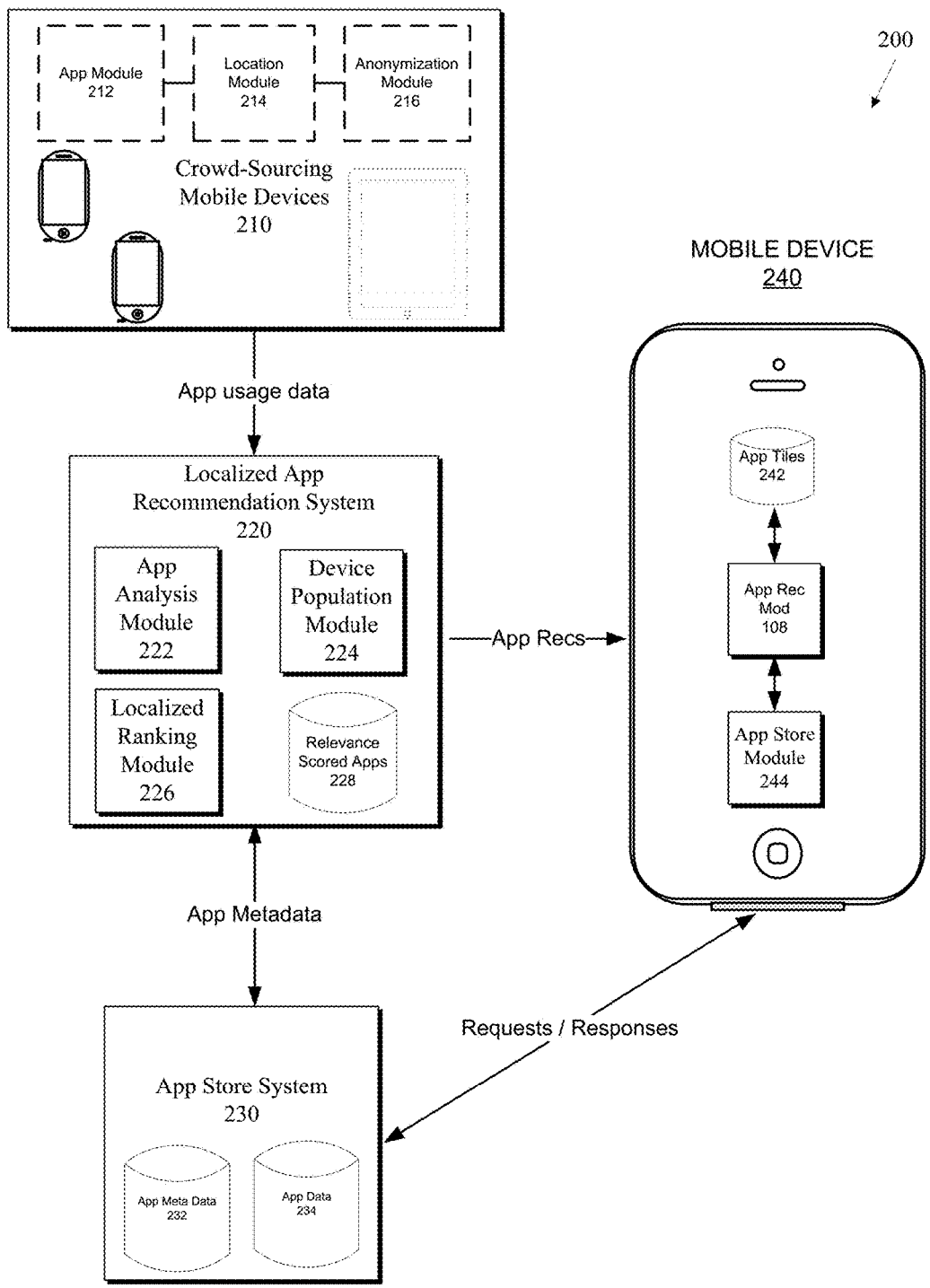
FIG. 2 shows a high-level block diagram of a system according to an embodiment of the present invention.

FIG. 2 shows a high-level block diagram of a system 200 for performing certain embodiments of the present invention. The system 200 comprises a plurality of crowd-sourcing mobile devices 210 for providing crowd-sourced app usage data, an app recommendation system 220, and an app store system 230.

Crowd-sourced location data can be anonymously crowd-sourced from the plurality of mobile devices 210. Devices may opt-in for this feature. Crowd-sourcing mobile devices 210 can include various hardware and software components, such as illustrated in FIG. 1, and/or an app module 212, location module 214, and anonymization module 216.

Mobile device 210 can execute applications with one or more app modules 212, which can launch and execute various applications. Mobile device 210 may tag location data to app usage. A location module 214 can determine a current location associated with the app event (e.g., launching the app) and tag the app event with the determined location. In one embodiment, a unique app identifier is assigned to an app. When that app is used, the location data is associated with the app identifier. For example, an application identifier (e.g., app bundle ID) may be associated with the best known current location. Privacy preserving rules (PPR) may be provided and only when privacy preserving rules are met is app usage data collected and submitted. An anonymization module 216 may be provided on the crowd-sourcing mobile devices to decimate data and/or ensure privacy preserving rules are satisfied. In one embodiment, location data for app usage and, optionally, time data may be anonymized on the device-side and submitted to the app recommendation system for further processing. Anonymization may occur on the server-side in addition to, or in lieu of, device-side anonymization.

Localized app recommendation system 220 may comprise an app analysis module 222, device population module 224, and a localized ranking module 226. The raw crowd-sourced data from the plurality of mobile devices 210 can be aggregated and the significant usage can be extracted by the recommendation system 220. Privacy may be preserved and relevant recommendations may be provided by a data processing pipeline that comprises: data decimation; estimation of the spatio or spatio-temporal distribution of usage for individual apps; detecting individual app usage hotspots; and combining the usage information of all the processed apps with metadata (category, user ratings, etc.) in order to generate a relevance-scored list of apps for every space-time bin with significant app usage. The app recommendation system may analyze aggregated data and identify statistical outliers to find apps especially relevant to a particular location. A database of relevance scored apps can be stored in relevance scored apps database 228. One example of an application that may be highly localized is the Apple Store application because it may be used more frequently at or near Apple retail stores. The app recommendation system may filter out apps that are common across many different locations. For example, a social networking app (such as Facebook) may have very weak localization, and therefore is not relevant to any particular location. Another possible example is the Find My iPhone application because the application is typically used when users cannot find their iPhone, rather than when a user is near a particular location.

App store system 230 may provide mechanisms for the user to discover locally relevant apps. App store system 230 can include a database 232 for storing metadata regarding apps available from the app store. App store system 230 can further include a database 234 of app data so that an app can be downloaded by a user.

App store system 230 can include an interface (not shown) for communications with a mobile device 240. This component can include mechanisms for presenting the user with locally relevant apps. Mechanisms for the user to discover locally relevant apps comprise: alerts and notifications, search tools, app categorization, application bundles, etc. In some embodiments, app recommendations are pre-chased to the mobile device, for example, from the localized app recommendation system 220. Mobile device 240 can include various hardware and software components, such as illustrated in FIG. 1, and/or an app tiles database 242, app recommendation module 108, and an app store module 244.

App tiles for a predetermined area proximate to a location can be pre-cached to mobile device 240. Pre-cached app tiles can be stored in app tiles database 242 on mobile device 240. In this manner, the more specific location recommendations can occur device-side (e.g., on the mobile device, without sending a location to the app store server in order to receive a recommendation). This can further privacy considerations and reduce battery and data consumption.

App recommendation module 108 can include code that, when executed, determines or provides an app recommendation to the user based on a location. For example, the user can request app recommendations for a particular location. In another example, a notification regarding a locally relevant app could be provided based on the mobile device's current location. App recommendation module 108 can interface with the app store module 244, which can provide a user interface for recommending apps in some embodiments.

Figure 3:
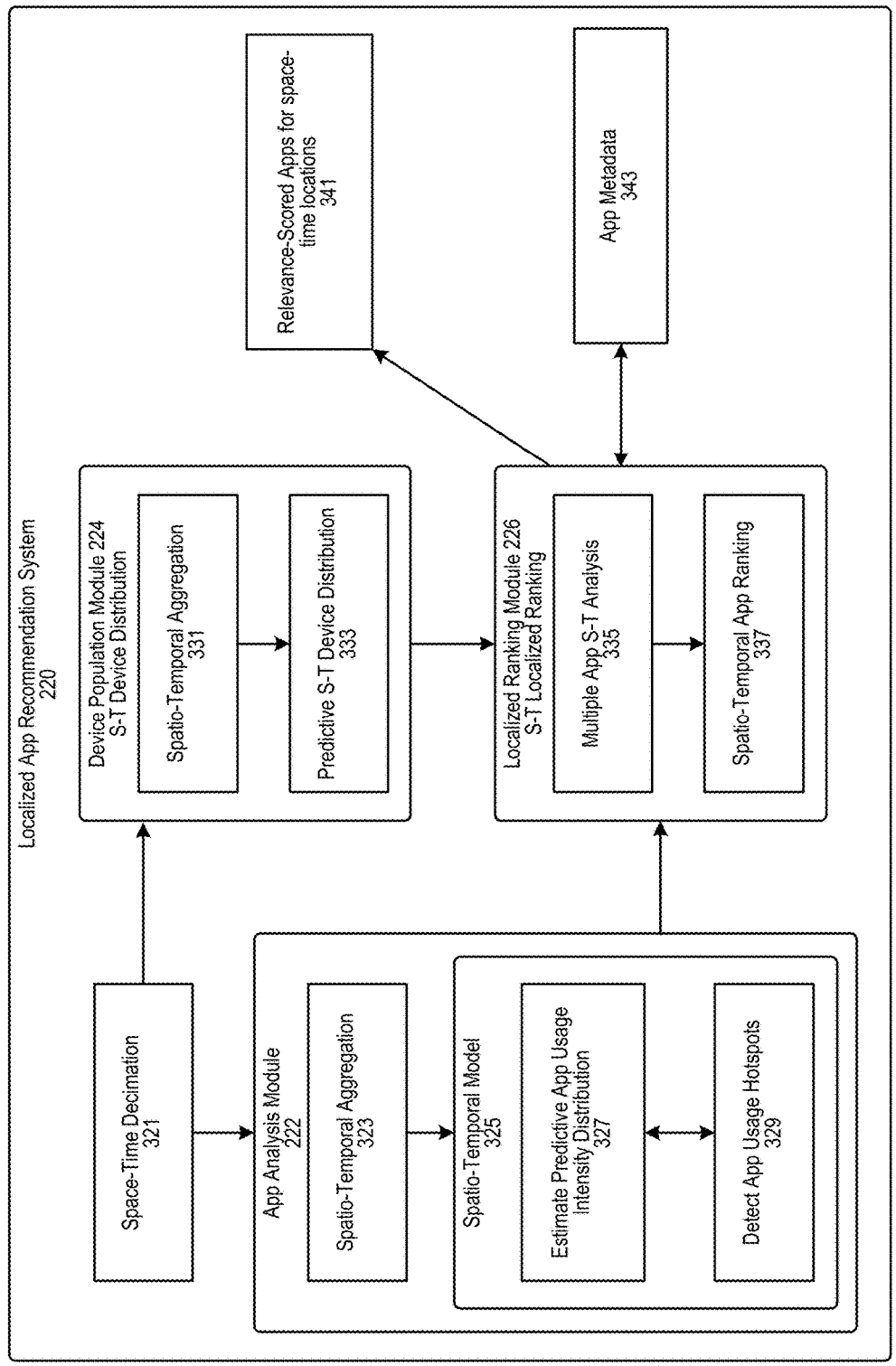
FIG. 3 shows a high-level block diagram of a localized app recommendation system according to an embodiment of the present invention.

FIG. 3 illustrates a more detailed version of localized app recommendation system 220 according to some embodiments. Localized app recommendation system 220 includes a module 321 for decimating data received from crowd sourcing mobile device in space and time. This can help ensure privacy rules are met. In some embodiments, space-time decimation module 321 can take app usage submission and round location and/or time data. Decimation (in space and time) is used for reducing the resolution of the data as needed. Decimated app usage data can be input into the app analysis module 222 and the device population module 224.

App analysis module 222 can include several sub-modules, such as spatio-temporal aggregation module 323 and a spatio-temporal model generator 325. Spatio-temporal aggregation module 323 takes the decimated app usage data, determines the app and location associated with each individual app event, and increments a counter for the identified app at a space bin (and/or a time bin). Spatio-temporal model generator 325 includes a module for estimating the predictive app usage intensity distribution 327 and a module for detecting app usage hotspots 329. Spatio-temporal model generator 325 operates on the raw bin count data generated by spatio-temporal aggregation module 323 to determine an estimated intensity of app usage at given locations and whether or not an app hotspot exists at given locations. This may be done on a per app basis. For example, for each app, predictive app usage intensity distribution module 327 determines the intensity of usage of that app at each location in the domain of interest. Hotspot detection module 329 can determine whether or not a hotspot exists for that app at each location in the domain of interest.

Device population module 224 can include several sub-modules, such as spatio-temporal aggregation module 331 and predictive s-t (space-time) device distribution module 333. Spatio-temporal aggregation module 331 may operate in a similar fashion to spatial temporal aggregation module 323. For example, spatio-temporal aggregation module 331 can take the decimated app usage data, determine the location associated with each individual device use event (rather than app), and increment a counter at a space bin (and/or a time bin). Predictive s-t device distribution module 333 can take the aggregated device usage data to generate a predictive model for device population.

A localized ranking module 226 can take input from app analysis module 222 and device population module 224, and calculates a s-t localized ranking of apps. Localized ranking module 226 includes several sub-modules, such as a multiple app s-t analysis module 335 and a spatio-temporal app ranking module 337.

Multiple app s-t analysis module 335 comparatively analyzes the intensity and/or hotspots of multiple apps. In some embodiments, multiple app s-t analysis module 335 normalizes the statistics (e.g., intensity, whether or not a hotspot exists) for the multiple apps so that the apps can be meaningfully ranked against other apps according to their local relevance. For example, an application associated with a sports team located in a major city's downtown area (such as the San Francisco Giants) might have an app that is used by fans at the ballpark in high volume. There could also be another app that exhibits highly localized usage, near the ballpark, but in much smaller volumes than the ballpark app (e.g., an app for a coffee shop located near the ballpark). Multiple app s-t analysis module 335 analyzes information from app analysis module 222 and device population module 224 and normalizes the data.

For each location (and/or time) bin, spatio-temporal app ranking module 337 provides a ranking of apps. The most locally relevant apps receive the higher rankings, while the least locally relevant apps receive the lower rankings. In some embodiments, a local relevance score is associated with each app for each location. In some embodiments, the apps are ranked based on ascending (or descending) order of the local relevance score for each space-time location.

Localized ranking module 226 can calculate a relevance score for each app for every space time location (341). In some embodiments, a predetermined number of top apps may be recommended for a particular space and/or time bin (e.g., top 10, top 25, etc.). In some embodiments, only apps with a ranking score above a threshold are recommended. In some embodiments, app meta data 343 can be used in conjunction with the relevance scored apps to provide an app recommendation. For example, multi-app predictive model and app metadata (category, user ratings, etc.) can be inputs for the space-time localized ranking. Using this process, the recommendation engine is able to generate a list of apps with associated local relevance for every space and/or time bin where significant app usage was detected.

Now that exemplary devices and systems have been described, we now turn to a high-level description of a method according to an embodiment of the present invention. The devices and systems described above can be used in implementing the following method.

II. Method Overview

One or more of the process blocks of the methods described herein may be optional and may be omitted. The sequence of one or more process blocks may be modified, and the process blocks may be performed in any suitable order. Some of the optional blocks and/or sequence modifications are specifically described herein for purposes of illustration; however, one having skill in the art will recognize that other modifications and omissions are contemplated within the scope of the disclosure.

Figure 4A:
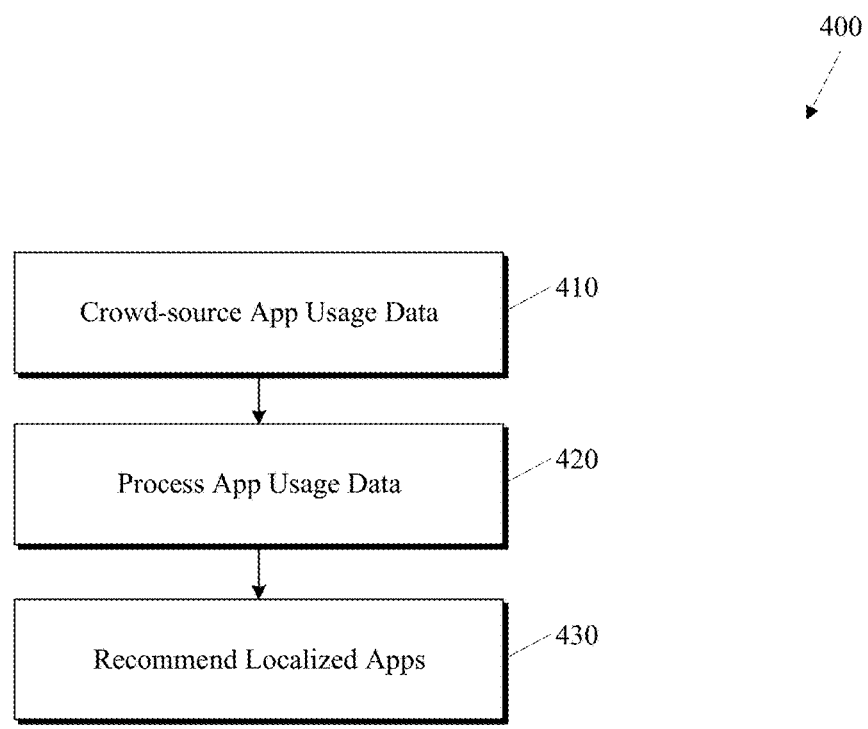
FIG. 4A shows a high-level flow diagram of a method of crowd-sourcing data, processing crowd-sourced data, and providing recommendations according to an embodiment of the present invention.
Figure 4B:
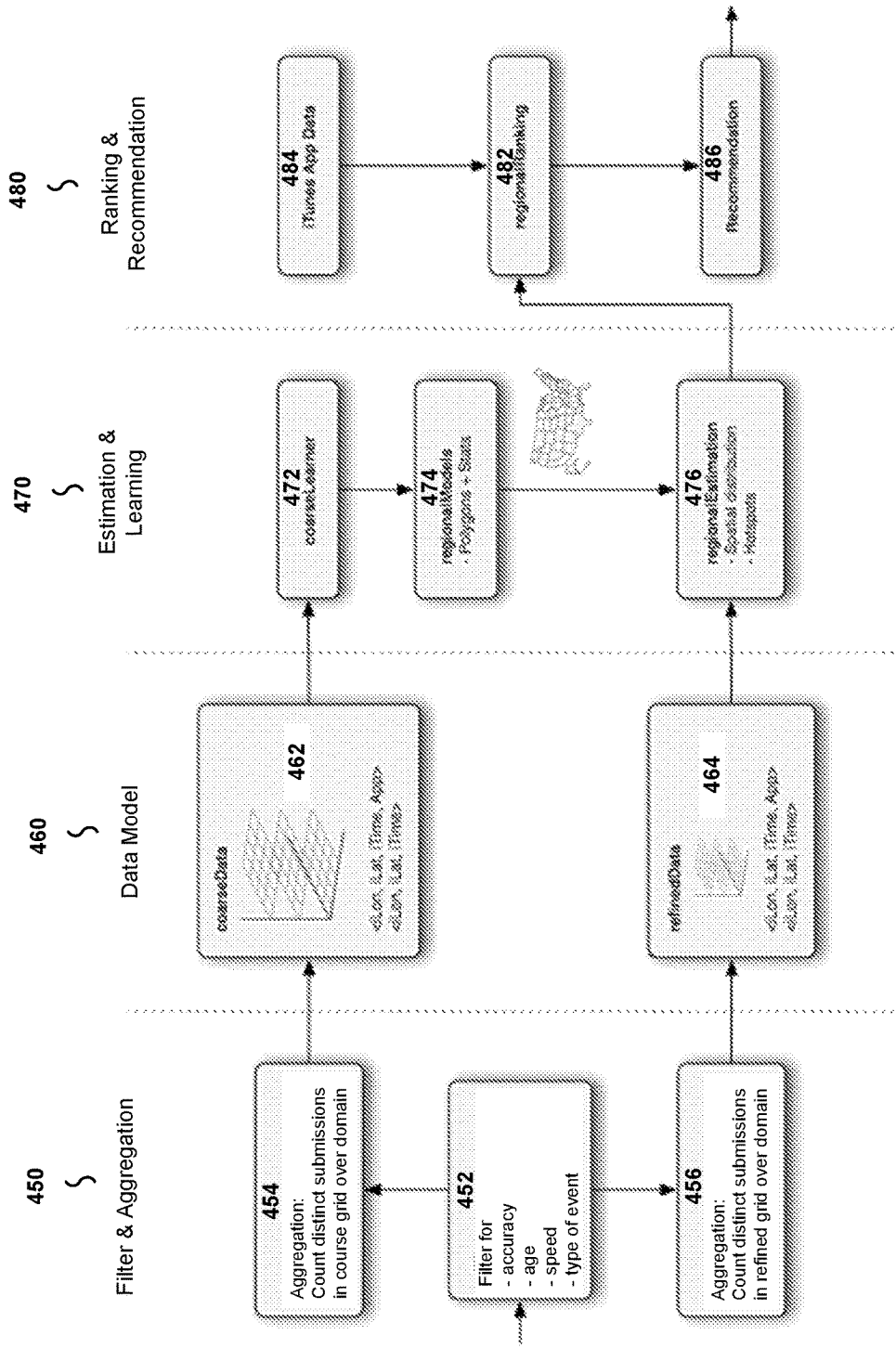
FIG. 4B shows a high-level block diagram and process flow for collecting data according to an embodiment of the present invention.

App usage may be tagged with location data, and app usage data (correlating an app and a location) can be analyzed for patterns indicating certain applications are particularly relevant to a given location. For example, spatial and/or temporal analysis and modeling can be conducted on crowd-sourced geo-localized app usage data. FIG. 4A shows a high-level flow chart of an embodiment of a process 400 for providing app recommendations based on mining anonymized crowd-sourced localized app usage data. FIG. 4B shows a high-level block diagram and process flows according to an embodiment of the present invention.

In step 410, app usage data can be anonymously crowd-sourced from a plurality of mobile devices. At a high-level, step 410 comprises determining the location of a mobile device, associating that location with an app event for a particular app, and submitting this data to an app recommendation system. This process will be described in more detail below in Section III (Crowd-Sourcing Data).

In step 420, the app usage data that was crowd-sourced from the plurality of mobile devices is processed. At a high-level, step 420 comprises receiving the app usage data, parsing the data, finding statistically significant app usage, and determining hotspots where particular apps exhibit highly localized usage qualities. This process will be described in more detail below in Section IV (Processing Data to Determine Localized Usage).

In step 430, the localization app usage data is used to identify relevant apps. At a high-level, step 430 comprises receiving a location relevant to a user (e.g., current location or other location of interest), querying an app recommendation system or database, and presenting locally relevant apps to the user. This process is described in U.S. patent application Ser. No. 13/843,291, filed concurrently with the present application, the disclosure of which is incorporated by reference in its entirety for all purposes.

FIG. 4B shows one embodiment of a system and process flow. In the embodiment shown, data is filtered and aggregated (450), a data model is generated (460), usage is estimated and learned (470), and ranking and recommendations are performed (480). Various filters may be applied before the data is aggregated (452). The filters can include a threshold location accuracy or confidence in the location (e.g., >1000 m, >500 m, >200 m accuracy, etc.), an age of the location data (e.g., <15 minutes old, etc.), the speed at the time the location was determined (i.e., how fast was the device moving), type of app event (e.g., launches of apps versus other uses of the apps, etc.). After the data is filtered it can be aggregated (454 and 456). In the embodiment shown in FIG. 4B, aggregation is done at two levels to generate two data models. At 454, aggregation is done at a lower resolution. For example, each distinct submission per 1 degree (or $\frac{1}{10}$ degree, $\frac{1}{1000}$ of a degree, etc.) location bin is counted. At 456, aggregation is done at a higher resolution. For example, each distinct submission per $\frac{1}{1000}$ degree (or $\frac{1}{5000}$ degree, etc.) location bin is counted.

The low resolution aggregated data is used to build a course model 462 (e.g., 1 km, 10 km, 100 km, etc.). From the course data, regional models can be generated (472, 474). That is, areas that are sufficiently homogenous can be identified and portioned for the purposes of regional estimation. The high resolution aggregated data is used to build a refined model 464 (e.g., 10 m, 25 m, 100 m, etc.). The regional models generated can then be used for calculating regional estimation (476), including calculating an estimated spatial distribution of usage and identifying hotspots of app usage. Data from the estimation and learning can then be used to provide recommendations (482). Recommendations can also be based on app data and meta data (484). Once apps are ranked or scored, recommendations (486) can be provided to the user based on the rank/score and/or other information. Additional details on these concepts will be described below.

III. Crowd-Sourcing Data

Figure 5:
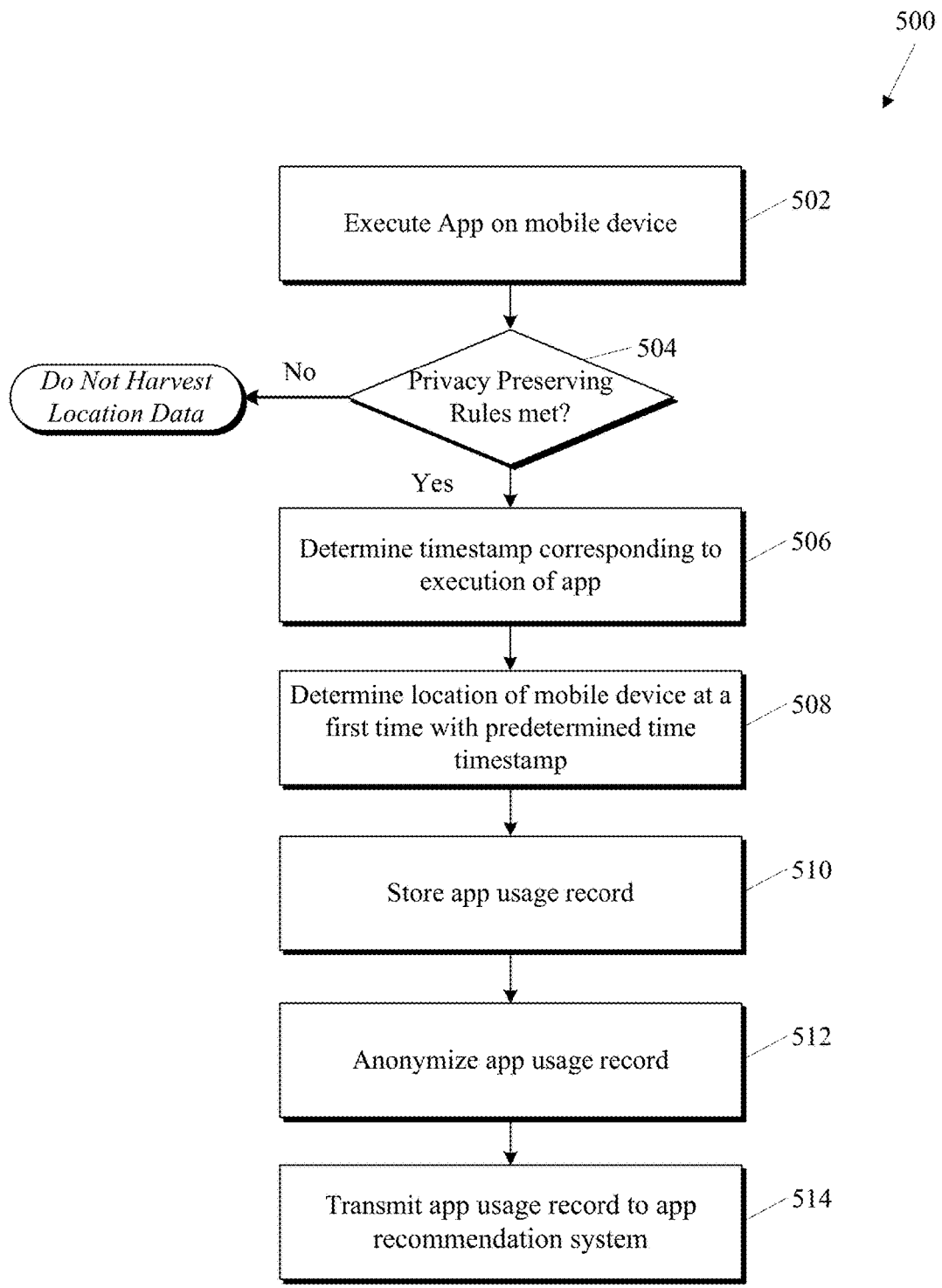
FIG. 5 shows a high-level flow diagram of a method of crowd-sourcing data according to an embodiment of the present invention.

FIG. 5 shows a flow chart illustrating a method 500 of crowd-sourcing app usage data on a mobile device. Method 500 is an example of step 410 in FIG. 3 performed by one of the plurality of mobile devices 210 in FIG. 2. Some of the steps shown are optional or may be performed in an alternative order.

In step 502, an app is executed on a mobile device. The app may start executing after a user input to launch or use the program. Execution of an app is one example of an app event. Other app events include downloading an app (whether new or previously downloaded) or performing some action within an app (e.g., listening to a certain song in a music app, reading a certain book in a book app, viewing media in a media player app, receiving a push notification from an app, etc.). Some applications may run in the background. In one embodiment, a predefined threshold execution time may be required before the app is considered to be executing. For example, usage of an app may be considered meaningful only if the app was used for 1 minute, 5 minutes, 30 minutes during a 60-minute time window, or another suitable time or duration.

In step 504, privacy preserving rules are checked. This step is optional but desirable in many circumstances to preserve user privacy. For example, in some embodiments, mobile devices opt in to app-location tagging. In some embodiments, certain app usage data is not submitted to advance privacy considerations. If privacy preserving rules are not satisfied, then the app usage data may not be crowd-sourced.

In step 506, a timestamp corresponding to the execution of the application is determined. The timestamp can identify when the application was launched (i.e., a start time), when the application stopped execution (e.g., end time), or both a start time and end time. These timestamps may be referred to as "app event timestamps." An app event timestamp may associate a time with any type of app event. Timestamps may be approximate.

In step 508, the location of the mobile device at a first time is determined. The first time may be within a predetermined amount of time from the timestamp. For example, the first time may be 5 minutes before the app event timestamp or 5 minutes after the app event timestamp (or any other suitable time). The timestamp at the first time may be referred to as a "location determination timestamp" since it is a timestamp associated with when a given location was calculated or determined. That is, the location determination timestamp can be different from the app event timestamp, or they could be the same.

In step 510, an app usage record is stored. The app usage record may be stored locally on the device. The record may be encrypted to protect location data. An app usage record may comprise an application identifier corresponding to an application, a usage location corresponding to an execution of the application, and a usage timestamp corresponding to an execution of the application.

In step 512, an app usage record may be anonymized. In some embodiments, anonymization may occur on the device-side. In some embodiments, anonymization may occur server-side. Anonymization could be performed on both the device and server. In one embodiment, location data is rounded off in the anonymization process. In some embodiments, user identifiable data is removed or masked from the app usage data. This helps ensure privacy preserving rules are met.

In step 514, app usage records are transmitted to an app recommendation system (e.g., localize app recommendation 220 in FIG. 2). In one embodiment, app usage records may be aggregated device-side and submitted at a predetermined time so that there are multiple app usage records submitted at once with a single submission. One advantage to submissions with multiple app usage records is that the recommendation system can determine that each of the multiple app usage records came from the same device without knowing the actual identity of the particular device or the device's user. This provides the recommendation system with additional information while preserving the privacy of users. Battery power and data usage may also be conserved as a result. In one embodiment, app usage records are submitted one at a time.

a. App Usage Data Collected

In one embodiment, the app usage data collected by the mobile device comprises: location data; time data; and an application identifier (app ID). An app usage record may be created for each event (i.e., use of a particular application at a particular location and/or time). The collected data for each event may be referred to as an app usage record. In one embodiment, the app usage record can be a tuple <LOCATION DATA, TIME DATA, APP IDENTIFIER>.

In certain embodiments, a plurality of app usage records may be aggregated on the mobile device and sent to the recommendation system as a single submission. In one embodiment, a submission comprises one or more app usage records, for example:

| | |
|---|---|
| { | $<L_1, t_1, A_1>$ |
| | $<L_2, t_2, A_1>$ |
| | $<L_2, t_2, A_2>$ |
| | ... |
| | $<L_x, t_y, A_z>$ |
| } | |

In the submission shown above, the first app usage record $<L_1, t_1, A_1>$ indicates that Application $A_1$ was used at approximately time $t_1$ at location $L_1$. The second app usage record $<L_2, t_2, A_1>$ indicates that application $A_1$ was used at approximately time $t_2$ at location $L_2$. The third app usage record $<L_2, t_2, A_2>$ indicates that application $A_2$ was used at approximately time $t_2$ at location $L_2$. Locations $L_1$, $L_2$, $L_3$, and $L_x$, may have a timestamp associated with when the respective location was determined, such as $t_{L1}$, $t_{L2}$, $t_{L3}$, and $t_{Lx}$. For example, $t_{L1}$ may be approximately the same as $t_1$ if the location was determined at approximately the same time as the app event. In another example, the difference between $t_u$ and $t_1$ represents the time between an app event and when the location was determined.

Location data may comprise geographic coordinates (e.g., latitude and longitude) or any other suitable data that describes the location of a mobile device. Location data may be approximate. Location may be determined in any suitable manner, including cellular, Wi-Fi, and Global Positioning System (GPS) networks. In some embodiments, one or more location determination methods may be used together.

A best known location and a location timestamp may be stored for each of one or more location technology types. In some embodiments, a set of best known GPS location, WiFi location, and cellular location and associated timestamps may be stored. In some embodiments, an array of sets of recent best known GPS locations, WiFi locations, and cellular locations and associated timestamps may be stored.

GPS location typically is the most accurate but also uses the most power. Cellular location uses the least power but is typically less accurate. Location data may include a location uncertainty value. The uncertainty value may indicate how reliable the location data is at the approximate time of the location determination. Uncertainty values associated with a determined location may be used to weight a determined location or decide to disregard a determined location in favor of another determined location with greater certainty or confidence. The uncertainty value may be in any suitable unit, including distance or a percentage. In one embodiment, the uncertainty value of a GPS signal is a value provided by a GPS chip on the device based on signal conditions. An uncertainty value for GPS location may be 5 m, 10 m, 15 m, for example. WiFi uncertainty may be based on the distance between the WiFi access points used for determining location. An uncertainty value for WiFi location may be 50 m, 60 m, or 100 m, for example. An uncertainty value for cellular location may be 500 m to 3-6 km, for example. One having skill in the art will recognize that these uncertainty values for various location technologies are exemplary and other values and other units of measure may be used without departing from the scope of the present disclosure.

In one embodiment, one of the one or more location technology types is chosen when a determination is made that the location is the most accurate. This determination may be made based on the uncertainty value associated with the location data (e.g., a GPS location with 5 m uncertainty may be chosen over a cellular location with 500 m uncertainty). The determination may be made based on time differentials (e.g., the location is stale or fresh). A best known location software module may make the determination of the best known location based on the determined locations from one or more location technology types. For example, a best known location software module may determine that a device has a GPS location that is 5 minutes old and will expire in 10 minutes (for a total lifespan of 15 minutes) and then cell location is obtained. The best known location software module does not necessarily overwrite the 5-minute old GPS location. Various logic and algorithms may be employed by the best known location software module.

In one embodiment, if the determined GPS location is less than 15 minutes old, then the GPS location is best. If not, the determined WiFi location is used if the determined WiFi location is less than 15 minutes old. If both the determined GPS location and the determined WiFi location are both greater than 15 minutes old, the determined cellular location may be used if the cell location is less than 15 minutes old. Finally, if no location technology has determined a location within 15 minutes of the app event, the app event may not be tagged with location data. In this example, fifteen minutes is merely exemplary and one having skill in the art will recognize that other time intervals are possible.

In one embodiment, the best known location software module determines the best known location amongst a plurality of technology types by comparing the uncertainty associated with the best known location for each of the plurality of location technology estimates. In one embodiment, if the newer location has lower uncertainty (i.e., has better accuracy) than the older location, the new location is used. In one embodiment, if the new location is 2-3× worse than the older location, the older location is used so long as the old location is not too old (e.g., not older than 15 minutes). That is, the older location is more accurate (less uncertainty) and it still has, for example, time left in the 15-minute lifespan.

In one embodiment, the best known location software module may take a distance differential into account to disregard or weight the determined location. For example, if two GPS locations were obtained close together with similar uncertainty values, but the determined locations were very disparate (e.g., too far apart for the device to have reasonably moved), it may be determined that one or both of the GPS locations is unreliable and the module may select a WiFi location or a cellular location or some combination of WiFi, cellular, and/or GPS location.

Time data may include a timestamp indicating when the application was launched, when the application stopped execution, or both a start time and end time. This is an example of an app event timestamp. Other app events that may be time stamped include app downloads and performing actions within apps. Time data may comprise an app use duration indicating the duration of app usage. For example, usage of an app may be considered meaningful only if the app was used for a predetermined duration.

Time data may comprise a location determination timestamp that represents the time at which a particular location was determined. Time data may comprise a location time delta value representing an amount of time that has passed since the location data was refreshed or updated. That is, location time delta value may be the difference between an app event timestamp and a location determination timestamp.

App usage may be normalized. For example, if an app is used 15 times in 15 minutes, this is only counted as one "use" of that app. LBS apps may also need to be normalized with respect to non-LBS apps because there may be a bias here towards apps that use location (LBS apps).

The application identifier (ID) may comprise an identifier for distinguishing between different applications. In one embodiment, the app identifier is a unique identifier. One example of an application identifier, currently used to identify apps in the App Store, is the "app bundle ID." Any identifier that uniquely identifies particular apps may be used.

Certain apps may not be tagged with location data and other data. In one embodiment, it may be known that certain apps are likely to not be localized or there is some other reason why app events should not be tagged (e.g., user or developer opt-out). There may be a flag or other identifier that indicates that a particular app should not be tagged or that any tags should be disregarded or not submitted to the app recommendation system. For example, certain apps that are preloaded onto a device, such as a mail app or web app, may not be tagged in some embodiments. In another example, a user can opt out of crowd-sourcing on a per app basis.

Other data may be collected to filter or weight submissions. In one embodiment, a speed filter may be used for relevance of app usage and/or the accuracy of best known location tagged with the app usage. In one embodiment, if the mobile device is moving slow (e.g., did not move very far in 1 hour), the location can be used for any app executed during that hour. For example, if you can detect that the mobile device did not move very far between use of LBS, but the time between use of LBS is greater than the "predetermined time," here 15 minutes, the last known/best known location can be used without waking up the GPS or other location determining subsystem. Therefore, if Location $L_1$ at Time $t_1$ is approximately the same as Location $L_2$ at Time $t_2$, where $t_2-t_1>$"Predetermined time" (e.g., 15 minutes), then tag all app usage between $t_1$ and $t_2$ with approximate location of $L_1/L_2$ since it is likely that the mobile device did not move very far. In another embodiment, if the mobile device is moving very fast when an app is used, the usage of the app is less likely to be locally relevant. For example, if an application is used by a passenger in a car driving on a freeway, it is likely that the app is not relevant to the geographical location that the car is passing through.

In one embodiment, GPS location may have a current speed associated with it. If speed is high, the GPS location might be expired faster than 15 minutes. Therefore, the "window" or "lifespan" for when a location is considered reliable may be variable based on speed. For example, if a GPS location is associated with a current speed of 60 miles per hour, or approximately 31 meters per second, and the location time delta value is large (e.g., 10 minutes), then the GPS location may be expired faster and/or an alternative location technology may be used (e.g., a cellular location with 1 km uncertainty value might be more accurate).

b. Time of App Usage Data Collection and App Usage Submission Interval

App usage data may be recorded by the device and stored whenever an app is used on the mobile device. In one embodiment, app usage data is recorded after an app is executing in the foreground. In one embodiment, app usage data is recorded after an app is executing in the background. In certain embodiments, a usage threshold may be required before use of an app is considered to be meaningful. For example, use of an app lasting five minutes may be considered more useful than 10 seconds of app use. In one embodiment, only app usage of a significant duration is collected and submitted.

Apps may be divided into two groups: apps using location-based services (LBS apps); and apps not using location-based services (non-LBS apps). LBS apps generally use location, subject to privacy preserving rules, to provide some services. Some apps will use location very frequently (e.g., every minute). Non-LBS apps provide a service that is not location related. Therefore, when an LBS app is used, the location of the mobile device is typically determined (in order to be used for the app's particular service), but when a non-LBS app is used, the location is typically not known as a result of the use of the non-LBS app. However, it would be beneficial to know whether non-LBS apps exhibited high localization as well.

In one embodiment, app usage data is collected when an LBS app is used. In some embodiments, the location data generated by the executing LBS app is used to create the app usage record. Therefore, there is no need for an additional location determination since location data is already known by the LBS app. In some embodiments, even though an LBS app is used, the location generated by the LBS app may not be accurate or location services may not be available. For example, there may be weak or inaccurate location data. In this case, it may be beneficial to use an "older" location if the older location is determined to be more accurate or reliable than the new location. One example is: a strong, accurate GPS signal was cached 5 minutes earlier by another app on the device; that older location may be used instead of a "current" location as determined by cellular data because the uncertainty value of cellular location is high relative to GPS location and the GPS location is relatively new.

In another embodiment, app usage data is collected when any app (LBS apps and non-LBS apps) is used. The best (or last known) approximate location of non-LBS app usage is determined based on other recently used location services. In one embodiment, either location data from an LBS app is used or, in the case of a non-LBS app, the location may be determined in response to execution of the application. That is, a location may be determined for a non-LBS app specifically for the purpose of generating app usage data. However, using GPS or other location services frequently may deteriorate battery life. It would be beneficial to know the approximate location of a mobile device at the time a non-LBS app was used without waking up the GPS.

A location services call may not be required every time an app event occurs. Rather, a best effort location or best known location tagging system may be used. For example, when a camera app is launched, location may be determined for geo-tagging. That app event (i.e., the launch of the camera app) may be associated with an app event location and an app event timestamp. The app event location and the app event time stamp for the launch of the camera application may be used by a subsequent (or prior) app event provided that it is sufficiently reliable. "Future" locations may be used to retroactively tag prior app events provided that the location data is sufficiently reliable. In some embodiments, any location data generated by an LBS app may be "borrowed" by another app if the location data is sufficiently reliable. In one embodiment, location is determined by the device at periodic intervals. For example, location may be determined every hour for time zone support. This determined location may be used by other apps.

In some embodiments, when a best known current location is determined by an LB S app, app usage records may be created using the best known location for all apps (including non-LBS apps) used within a predetermined estimated location window. In this embodiment, the location for the non-LBS app is approximate. However, there is a fairly high confidence that the location is relatively accurate if the predetermined estimated location window is sufficiently small. For example, if the predetermined estimated location window is 15 minutes, it can be stated with some confidence that the mobile device likely is located close because the mobile device can only move so far in 15 minutes. Any suitable predetermined estimated location window could be used (e.g., 5 minutes, 50 minutes, 1 hour, etc.).

For example, when a first LBS app is used, the mobile device may tag a second app used within the previous 15 minutes of the execution of the first LBS app with the location data, as determined by the first LBS app at a first time. In one embodiment, a series of app usage records may comprise the following when the predetermined estimated location window is set at 15 minutes:

| | |
|---|---|
| $<L_1, t, A_1>$ | where location $L_1$ is determined at time t by LBS app $A_1$ |
| $<L_1, t + 5 m, A_2>$ | where location $L_1$ is associated with non-LBS app $A_2$ at time t + 5 m is determined at $t_0$ by LBS app $A_1$ |
| $<L_1, t + 12 m, A_3>$ | where location $L_1$ is associated with non-LBS app $A_3$ at time t + 12 m |

-continued

| | |
|---|---|
| | If non-LBS app A5 is used at time t + 17 m for a non-LBS app, an app usage record may not be created because the location data may not be considered accurate or current. |
| $<L_2, t + 20 m, A_4>$ | where location $L_2$ is determined at $t_1$ by LBS app $A_4$ |

The predetermined estimated location window can be a period of time before a location determination is made, after a location determination is made, or before and after a location determination is made (e.g., by the execution of an LBS app). Best known location for an app event in a predetermined estimated location window may have a location determination timestamp before the app event (backwards looking) or after the app event (forward looking). In one embodiment, the best known location was determined before the app event. For example, use camera app, get location when camera app is running, and cache that app event location and app event timestamp. Then, 5 minutes later a second app is launched that does not or cannot determine location accurately. The second app may use the location information as determined by the camera app because it is only 5 minutes old and is reliable. In one embodiment, the best known location was determined after the app event. In this embodiment, an array of past app events may be maintained on the device. If a reliable location is determined after a particular app event, then the location may be retroactively applied to one or more of the past app events in the array. This may be used to update locations in the array as more accurate and reliable location data becomes available.

The concept of borrowing location data determined by a first LBS app may also apply when a second LBS app is launched but, for some reason, the location cannot be determined by the second LBS app. That is, the second LBS app may use the location data as determined by the first LBS app if the first and second LBS apps were executed within the predetermined time period.

In one embodiment, when "borrowed" location is used by a non-LBS app (or an LBS app that cannot determine the location at a particular time), a location confidence level may be associated with the borrowed location. The location confidence level may be correlated with an amount of time that has passed since the location was considered current. In this sense, the concept of an "age" of the location data, or "stale" location data, may be used weight location estimates using borrowed location data. The age of the location data relative to an app event may be referred to as a location time delta value. Age can be used to grow the uncertainty estimate. Age can be used to weight location information (e.g., fresher samples get a greater weight in hotspot detection). For example, if App A is used immediate after a location determination, the location data for that use of App A (at $t_1$=t) should be fairly accurate, but there is less confidence as to App B used at time $t_2$=t−15 minutes. In 15 minutes, the mobile device could have moved to a different location and therefore there is less confidence that the location is determined at $t_2$.

App usage data may be submitted by the mobile device to the recommendation system at any suitable time. In one embodiment, app usage data may be transmitted shortly after an app is used. In one embodiment, mobile device transmits a submission about every 12 hours and each submission may contain a set of one or more app usage records. In some embodiments, apps records are submitted only when the device has a certain power status (e.g., connected to external power or sufficient battery life remaining) and/or network connection (e.g., WiFi versus cellular data). One having skill in the art will recognize that any suitable submission interval may be used. Using a sufficiently large time interval has the advantage of further preserving privacy of the user, conversing battery power, and reducing data usage charges.

For example, when app usage data is submitted every 12 hours, real-time location data is never known by the app recommendation server. In this example, the set of one or more app usage records may be the app usage records generated by the device in the previous 12 hours, or other suitable submission collection interval. In another embodiment, the set of one or more app usage records may be app usage records generated by the device in the time interval from 12 hours to 24 hours before the submission; that is, the submission may contain data that is 12 hours (or more) old on the device to further preserve privacy.

In some embodiments, a method comprises: executing an application on a mobile device; assigning an application identifier to the application; determining a timestamp corresponding to the execution of the application on the mobile device; determining, by the mobile device, a location of the mobile device at a first time, the first time within a predetermined amount of time of the timestamp; storing, to a memory on the mobile device, an app usage record including the application identifier corresponding to the application, the location, and the timestamp; and transmitting, by the mobile device, the app usage record to an application recommendation system. In some embodiments, determining the location is performed when a location-based application is used. In some embodiments, the location-based application is different from the application. In some embodiments, the method further comprises storing a usage record for each application used within a predetermined time before the location-based application is used. In some embodiments, the application event record is encrypted.

Now that the collection of crowd-sourced app usage data has been described, the disclosure turns to the analysis of the data by the localized app recommendation system (e.g., 220).

IV. Processing Data to Determine Localized Usage

Figure 6A:
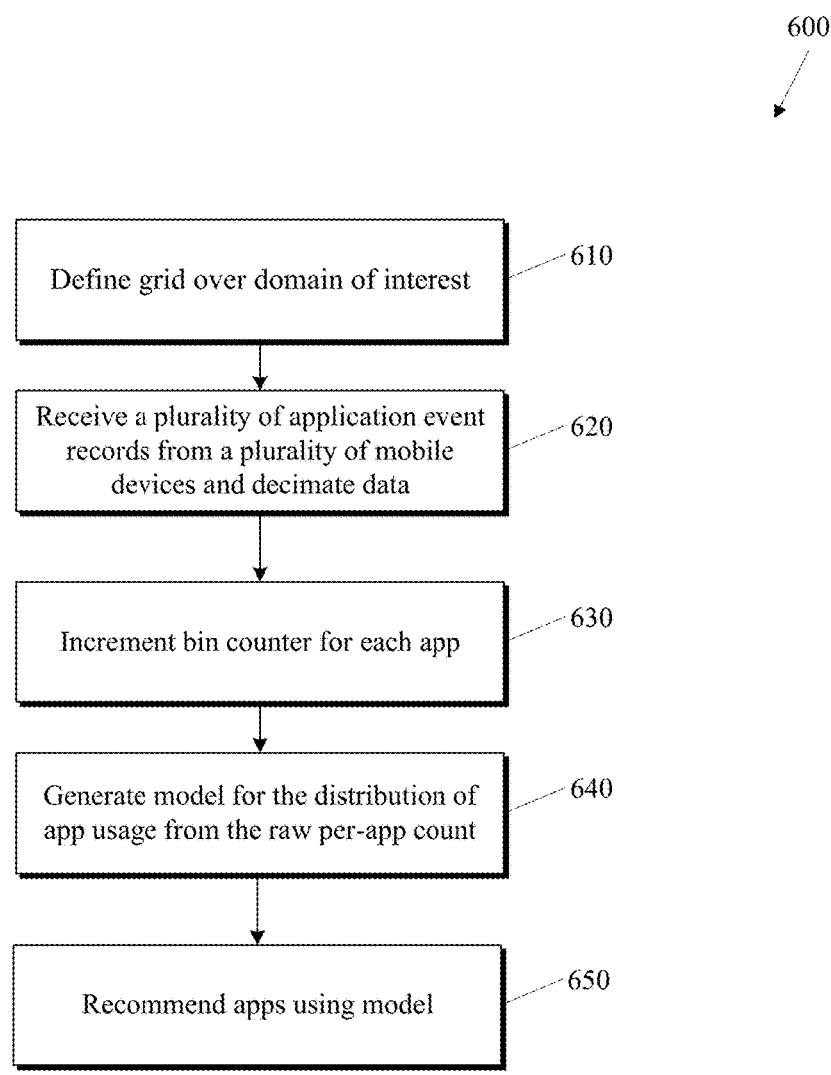
FIG. 6A shows a high-level flow diagram of a method of analyzing data and providing recommendations according to an embodiment of the present invention.

FIG. 6A shows a flow chart illustrating a method 600 of aggregating and processing raw data in order to extract localized app usage to recommend for a particular location. Apps are recommended based, in part, on local relevance. Therefore, it would be beneficial to have a model for calculating, estimating, and predicting the relevance of each app Ai at any given location Lj.

Method 600 is an example of step 420 in FIG. 4A for building such a model. Some of the steps shown are optional or may be performed in an alternative order. The method may be performed by a localized app recommendation engine (e.g., 220). Raw data needs to be aggregated and the significant usage needs to be extracted. This may be achieved by a data processing pipeline that combines the steps of: definition of bins for a domain of interest (610); receiving a plurality of app usage records from a plurality of mobile devices and decimating data (620); incrementing bin counter for each app (630); generating a model for the distribution of app usage from the raw per-app count (640); and recommending apps using model (650).

Figure 7:
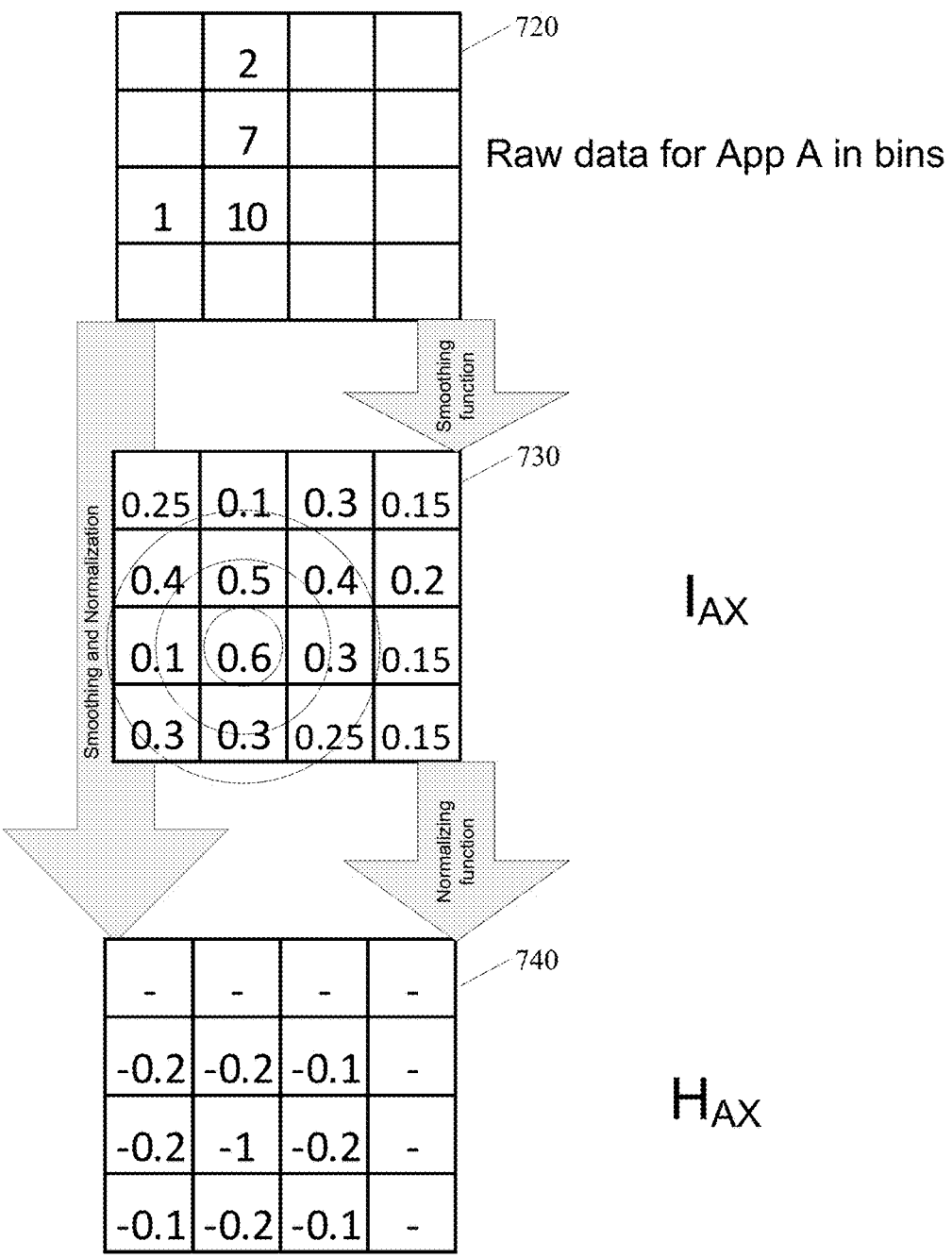
FIG. 7 shows a sample data set, a smoothing function, and a normalization function according to an embodiment of the present invention.

An example of defining a grid over a domain of interest in step 610 could be selecting a region around the city of interest. In one embodiment, the selected region is a 1×1 degree area. In some embodiments, the selected region is one of a plurality of non-uniform tessellations, described herein. The region may be divided into a grid of 1000×1000 locations Lj, each bin in the grid being $\frac{1}{1000}$ degree$^2$, or about 100 m$^2$. FIG. 7 shows a high-level example of a data set and operations on a data set for illustration purposes. The domain of interest is defined by a grid 720 that is 5 cells by 5 cells. The data set and the specific values are for illustration only and may not represent values that would actually exist in a real world application.

Returning to FIG. 6A, at block 620, a plurality of app usage records from a plurality of mobile devices is received and the data may be decimated. For example, at each location bin (Lj) in the grid, the number of (distinct) users running each app (Ai) on a particular day can be estimated by counting the number of submissions for each App (Ai) at every location (Lj) over a period of time (e.g., a month).

At block 630, when app usage data is received with usage by that particular app and the particular location, a bin counter for each app at that location is incremented. This aggregation step includes on counting the number of submissions for each app at every space-time bin that has data. For example, in FIG. 7, grid 720 has raw app count data for App A. The numbers in the bins are a counter for that bin with respect to App A. Blanks in the grid indicate no data (a zero counter value).

Figure 6B:
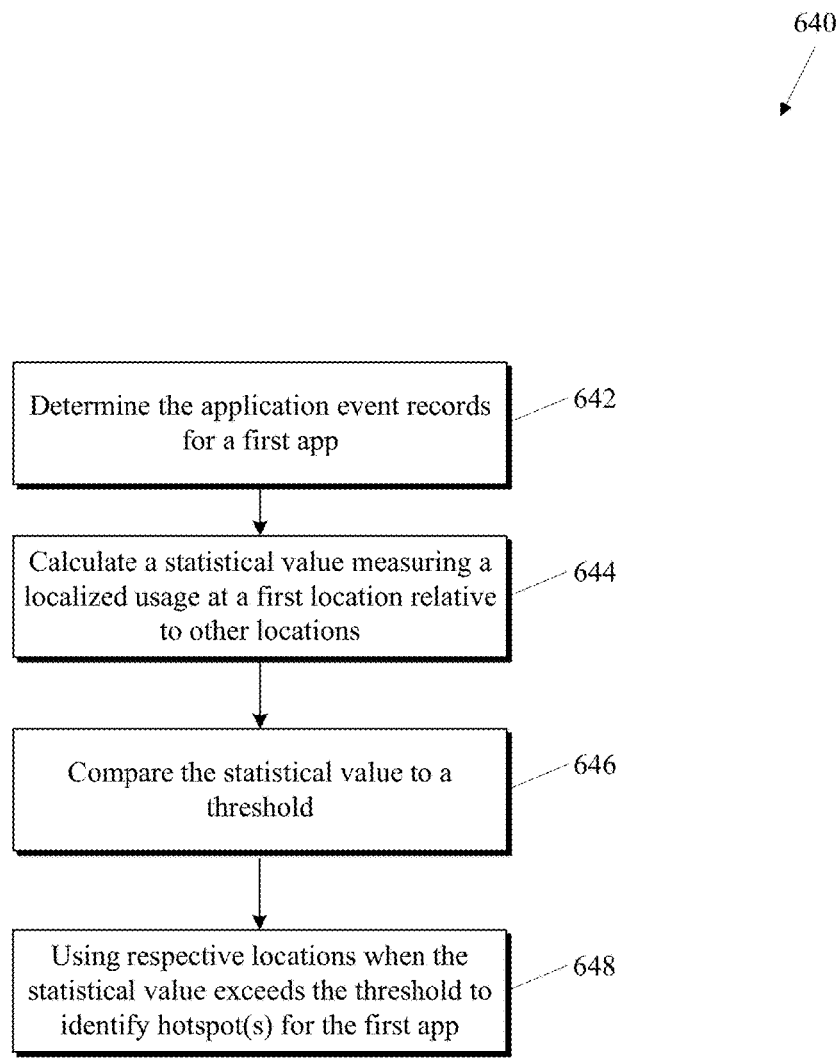
FIG. 6B shows a high-level flow diagram of a method of analyzing data and providing recommendations according to an embodiment of the present invention.

At block 640, a predictive model for the distribution of app usage can be generated from the raw per-app count. In some embodiments, a predictive model for device population can be generated from the raw device submission count. FIG. 6B shows an expansion of block 640 according to some embodiments of the invention.

In step 642, the app usage records for a particular app are identified. For each App (Ai), the intensive of app use of the grid of locations (Lj) can be estimated.

In step 644, a statistical value measuring a localized usage at a first location relative to other locations. An example of the statistical value is a raw data count at bins, a smoothed count (e.g., $I_{AX}$), or the value of the Laplacian of the smoothed counts in the bins. The statistical value is relative to other locations to ensure differences from one location to another are measured. The Laplacian obtains the relative values as it is the curvature of the data set, which inherently measures differences from one bin to another.

In step 646, the statistical value measuring is compared to a threshold. The comparison can be accomplished by comparing raw data to the threshold, and removing noisy data in that manner. Alternatively, the comparison can be of the statistical value to a threshold, where locations only show a relatively low extrema (e.g., curvature is local maxima but not very high, therefore is not a pronounced peak indicative of a hotspot). In one embodiment, the estimation of intensity of usage over the grid of locations uses Gaussian kernel smoothing and thresholding for removing noisy points.

In certain embodiments, the usage intensity may be calculated using methods for estimating the spatial distribution of app usage from anonymized crowd sourced localized app usage data. For example, a 2D Gaussian Kernel Smoothing function may be used to find a local extreme that is sufficiently far away from other local extrema. To arrive at $I_{AX}$, a smoothing function is applied to arrive at grid 730. One example of a smoothing function is a Gaussian function.

For each App (Ai), identify the local hotspots. In step 648, hotspots are identified when statistical value exceeds the threshold. For each app, usage hotspots are detected based on the per-app distribution of app usage when the statistical value exceeds the threshold at a particular location. This step could also make use of the device population distribution (see below) for normalizing against population density variations.

In one embodiment, identifying location hotspots (local extrema) uses the Laplacian of Gaussian operator, an image processing technique. The Laplacian of Gaussian (LoG) is a 2nd derivative over space to find an extreme that is a maximum (i.e., to find the peak). One advantage to the LoG is that the calculation is relatively fast. To arrive at $H_{AX}$, a normalization function is applied to $I_{AX}$ to arrive at grid 740 (it is also possible to apply a smoothing and normalization function to the raw data; e.g., the Laplacian of Gaussian). The "-" indicates bins that were filtered out as part of the smoothing and normalization. Note that the maximum value (0.6) in grid 730 maps to a negative value indicating a maximum (or minimum).

The relevance of each app Ai at any given location Lj can be estimated as a function of: usage intensity, spatial entropy, and presence of hotspot. In one embodiment, location relevance (R) of an application (A) may be defined as follows:

$R(X,A)=f(I_{AX}, H_{AX}, IG_{AX})$, where:

R is a function of X (a particular location) and A (a particular app)

$I_{AX}$ is Local Usage Intensity for App A at location X $H_{AX}$ is the presence of a hotspot at Location X (yes or no)

$I_{GAX}$ is information gain (i.e., given particular app usage data, what is the probability that the app is being used is App X?).

The scores of different apps within a particular bin X can be used for a ranking or notification, as described herein. The $I_{AX}$ can provide information that the usage of an app is high. This localized usage can be normalized against usage in other bins, and a background usage across all bins (e.g., an average) could be subtracted out. If $I_{AX}$ is high for a bin, but it is not near a hotspot for the app, then an app would be less localized to that bin, than if it was near a hotspot or was a hotspot.

The steps of the method 600 will be described further in the following subsections.

a. Grid and Bin Definition

A grid can be defined over the domain of interest (e.g., block 610 in FIG. 6A). The grid may have space elements (e.g., location) and optionally may also have a time element (e.g., spatio-time grid). A two-dimensional grid comprising a plurality of discrete bins may be used. The grid may be represented in a data structure. In one embodiment, each bin represents a particular geographic area. In some embodiments, grids have fixed bin shape and/or size. In other embodiments, grids have variable bin shape and/or size. There may be a separate space grid (or space-time bin) for each app. There may be a space grid (or space-time bin) for submissions from devices regardless of what app was used (i.e., discarding the app information for determining device population).

Fixed grid. In certain embodiments, the bins may be a predetermined fixed size and shape. One embodiment, with a 4-bin by 4-bin grid (16-bin area), is shown in FIG. 7. In one embodiment, a grid comprises 13-bin by 13-bin polygon (169-bin area). Any suitable grid size may be used. Each bin may be a 100 m×100 m square. Any suitable bin size may be used. Counters may be incremented for each app use that occurred within a bin. A smoothing function, such as a Gaussian kernel, may smooth the raw app counts across the entire 13 bin x 13 bin grid, allowing for locating local extrema within the grid. This process may be repeated across many other grids. For example, each bin in a grid may represent a 100 meter×100 meter square (1/1000 of a degree of latitude/longitude is approximately 100 meters). Each time an app is used within that 100 meter×100 meter square, a bin counter for that particular bin may be incremented. In certain embodiments, the bin size may be larger or smaller.

Variable bin size; fixed shape. In certain embodiments, the bin shape may be a fixed shape (e.g., rectangle or square) but the bin size may be variable. For example, 100 m×100 m bin size may be too granular to determine localization for some apps or not granular enough for other apps. Therefore, in certain embodiments, it may be possible to increase or decrease bin size as appropriate. The larger the bin dimensions, the less resolution. Therefore, a 100 m×100 m bin size has a greater resolution than a 1000 m×1000 m bin size. Referring to FIG. 7, for the purposes of illustration, a four-bin by four-bin grid is shown. The raw bin counts in 720 are smoothed and normalized over the four-bin by four-bin grid in 530 and 540.

In one embodiment, bin size varies based on device population. For example, if the value of bin counters is low, adjacent bins may be combined and the respective bin counters summed. Variable bin size has an advantage of preserving privacy in areas where there is limited data. For example, in a rural area, one person's property may cover one or more bins at a certain bin resolution. In this instance, variable bin size might be used to combine adjacent bins to preserve privacy. It is also possible that bin data will be ignored or discarded unless a bin counter threshold value has been met. For example, unless a particular bin is greater than bin_counter_threshold_value, it will not be factored into the app recommendation analysis.

Variable bin size and shape. In one embodiment, the shape and the size of the bins within the grid may be variable. Variable grid size and shape may better account for difference in population density in urban and rural areas. Variable grid size and shape may further preserve privacy. There are different methods that may be used for defining variable bin sizes and bin shapes. One such method that could be used in accordance with certain embodiments of the present invention includes creating non-uniform spatio-temporal tessellations based on crowd-sourced location data, as described in subsection (h) (Regional Models Using Tessellations). Non-Uniform Spatio-Temporal Tessellations may be used to create an adaptive mesh, which is useful for defining polygons where the "local" statistics are going to be computed.

Variable grid size and shape. When the number of submissions is relatively smaller or larger, a variable grid size may improve results. In one embodiment, the grid itself may be variable sized and/or shaped. For example, a sparsely populated area and a densely populated urban area may require grids with different resolutions. In some embodiments, grid size may be adaptive. The grid size and the number of bins within a grid over a domain of interest may vary based on the number of submissions. One method that could be used to create variable grids in accordance with certain embodiments of the present invention includes creating non-uniform spatio-temporal tessellations based on crowd-sourced location data, as described in subsection (h) (Regional Models Using Tessellations).

b. Receive Data Submission

Decimation (in space and time) may be used for reducing the resolution of the data, and matching the appropriate space-time resolution of the grid bins. Location data may be decimated device-side or server-side. For example, in some embodiments, precise location data may be not be required. For privacy reasons, it may be beneficial to decimate the location data to the level that is required.

Decimated data is aggregated over the bins defined by the grid. Aggregation step consists of counting the number of submissions for each app at every space-time bin that has data. For example, each space bin (or space-time bin) may have a counter.

Figure 8:
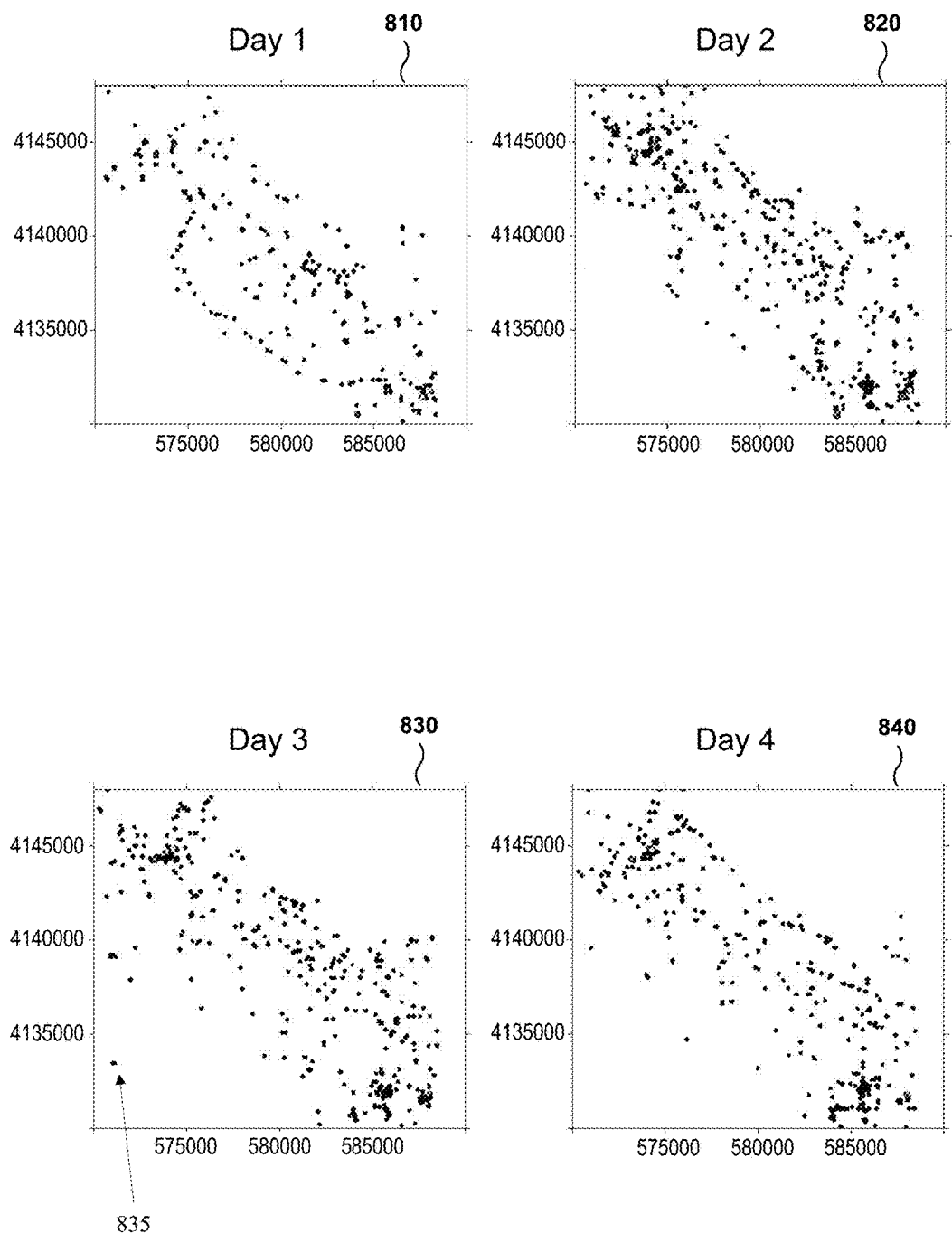
FIG. 8 show graphs of sample data sets according to an embodiment of the present invention.

FIG. 8 shows an example of raw data for an app Ai (here, the Apple Store app available from the App Store) over a domain of interest (here, the San Francisco bay area) during a 4-day period. The number of submissions was counted over a grid of ~100 m×100 m and a period of 1 day. There are four different "snapshots" of raw app counts for each of the four different days (810, 820, 830, and 840).

It can be observed from FIG. 8 that even though the usage of the app presents relatively consistent areas of usage over the four different days, there is a component of random noise component in the data. For example, there is little or no app use in the Pacific Ocean or San Francisco Bay for the Apple Store app, but day 3 has what could be an outlier app usage (835) in an area that appears to be at or near the ocean. De-noising the data would increase the accuracy of the model. Removing the noise would leave data that is more representative of consistent and significant usage of a given app. In some embodiments, noise can be removed using a thresholding technique.

c. Estimating Local Usage Intensity

The crowd-sourced data can be used to model app usage intensity and/or device population. Regarding app usage intensity, the crowd-sourced data can be used to estimate the predictive spatial distribution of app usage intensity for an app (e.g., App A) over a domain of interest (e.g., a grid). Regarding device population, the crowd-sourced data can be used to estimate the predictive spatial distribution of device usage intensity (e.g., device population or density) over a domain of interest (e.g., a grid).

In some embodiments, the grid represents space only (e.g., grid G_s for space). For example, given a location (e.g., a bin in the grid), the model can estimate the predictive spatial distribution of app usage intensity for an app. A time element can be added by using a series of time snapshots of grid G_s, where each of the time snapshots are analyzed independently and used together with a dynamic model for the time component.

In some embodiments, the grid represents time and space (e.g., G_st for space and time). For example, given a time and location (e.g., a bin in the grid for a time and location), the model can estimate the predictive spatial distribution of app usage intensity for an app.

Local usage intensity ($I_{AX}$) can be defined as the intensity of app usage of App A as a function of location (X). That is, local usage intensity indicates how intense is app usage for a particular app (e.g., app usage intensity), or for devices generally (e.g., device population density), at a particular location in the grid. $I_{AX}$ can be estimated based using smoothing function. The smoothing function can be applied to the raw data set. For example, if just the raw data was used, then the changes from one bin of the grid to the next bin of the grid could be sharp. However, such sharp changes may not represent realistic differences, but rather may be the result of an imperfect sampling set because the sample set is not infinitely large. The smoothing function provides an approximation of what the counts in the bins would be if a very large number of data points were obtained. Various statistical distributions can be used.

Figures 9A, 9B:
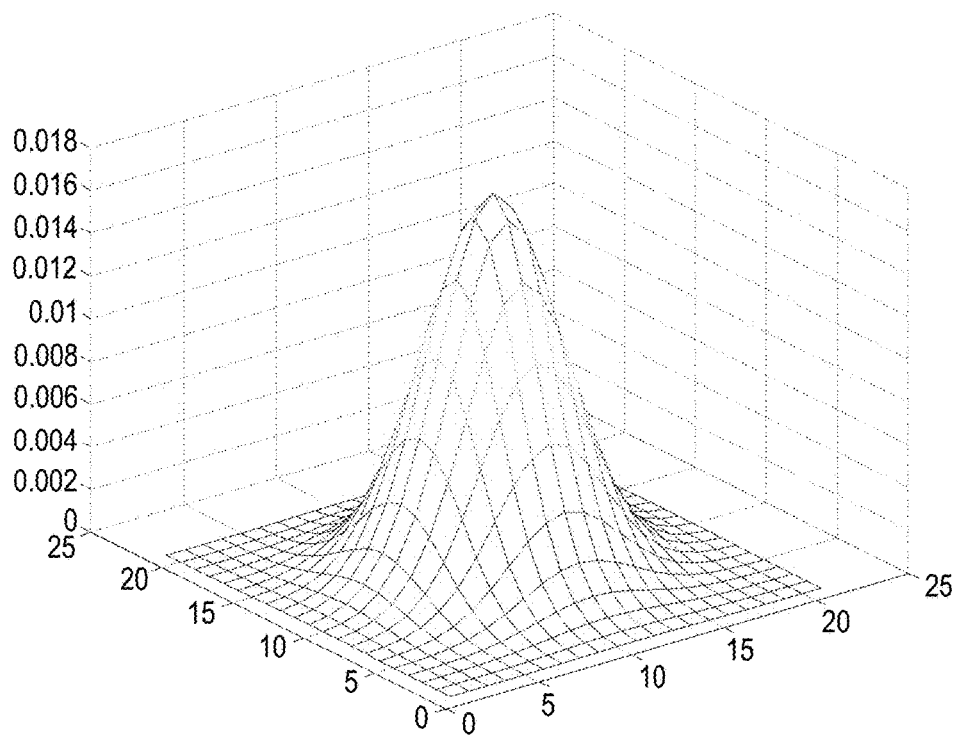
FIGS. 9A and 9B show the Gaussian equation and graph that can be used according to an embodiment of the present invention.

In one embodiment, a Gaussian smoothing function is applied to the dataset. In some embodiments, a 2D Gaussian kernel for smoothing function is applied to the event-derived data. This transforms the data from discrete events (e.g., raw bin counts) to a continuous spatial distribution over the domain of interest. FIG. 9A shows a formulation of the Gaussian kernel for the 2D case (Formula Source: http://fourier.eng.hmc.edu/e161/lectures/gradient/node10.html).

An example of this kernel is shown in FIG. 9B. In some embodiments, convolution of the (per app) raw submission counts is combined with the two dimensional Gaussian kernel. The standard deviation (sigma) of the kernel defines the bandwidth for the spatial filter. A larger sigma means more smoothing, whereas a smaller sigma means less smoothing.

Figure 10A:
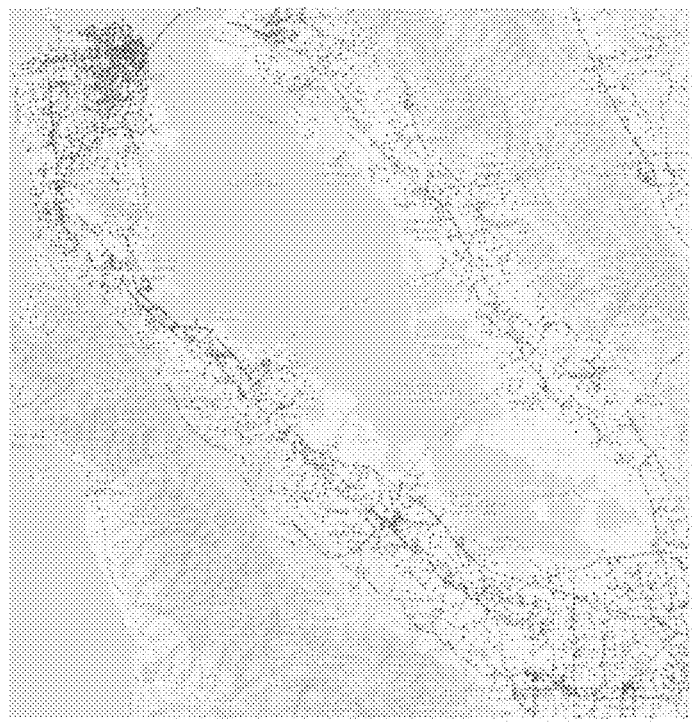
FIGS. 10A and 10B show sample data sets and sample hotspot detection according to an embodiment of the present invention.
Figure 10B:
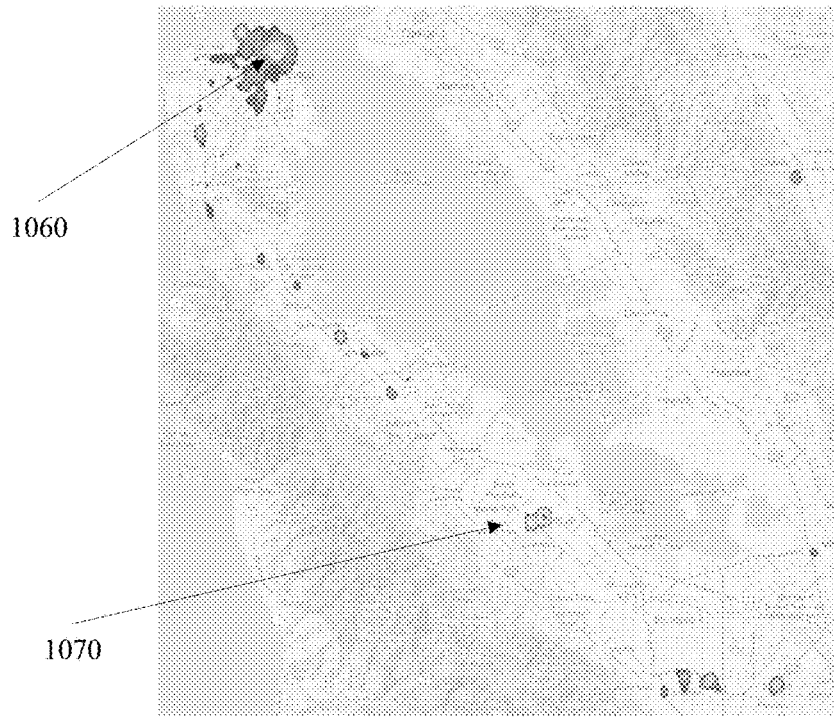

Turning to an example, FIG. 10A shows event counts over a spatial grid (with bins sized 100 m×100 m) aggregated during a month-long period. This represents the raw data before a smoothing function is applied. Notice there is noise in the data and it is difficult to pinpoint the areas with the most intense usage or density. FIG. 10B shows the estimated intensity ($I_{AX}$) of App usage based on Gaussian kernel smoothing and thresholding (based on maximum regional intensity). In the illustrated data, a threshold of 7% of the max achieved intensity inside the spatial domain is used. This means that bins with less than 7% of the bin with the maximum value are ignored in a thresholding process. Reference numerals 1060 and 1070 show two areas where significant app usage occurred after a thresholding process. Any suitable threshold could be used, including a minimum number of submissions over a time period, a percentage of submissions, etc. Although a Gaussian Kernel Smoothing with thresholding is shown, other smoothing functions may be used to smooth the event-derived data (i.e., the discrete event) into a continuous spatial distribution.

In some embodiments, determining $I_{AX}$ may include a thresholding technique for eliminating noise from the data (e.g., de-noising). Thresholding removes data points that are not statistically significant, such as noise.

d. Identifying Hotspots

Once a spatial distribution has been estimated, hotspots can be identified from the crowd-sourced localized app usage data. Presence of hotspot ($H_{AX}$) is a value indicating whether a particular location X (i.e., a particular bin in a grid) is a hotspot for App A, such as a yes/no flag or 0/1 binary value. In one embodiment, H may be a number representing how "hot" a spot is or is not.

Figure 11:
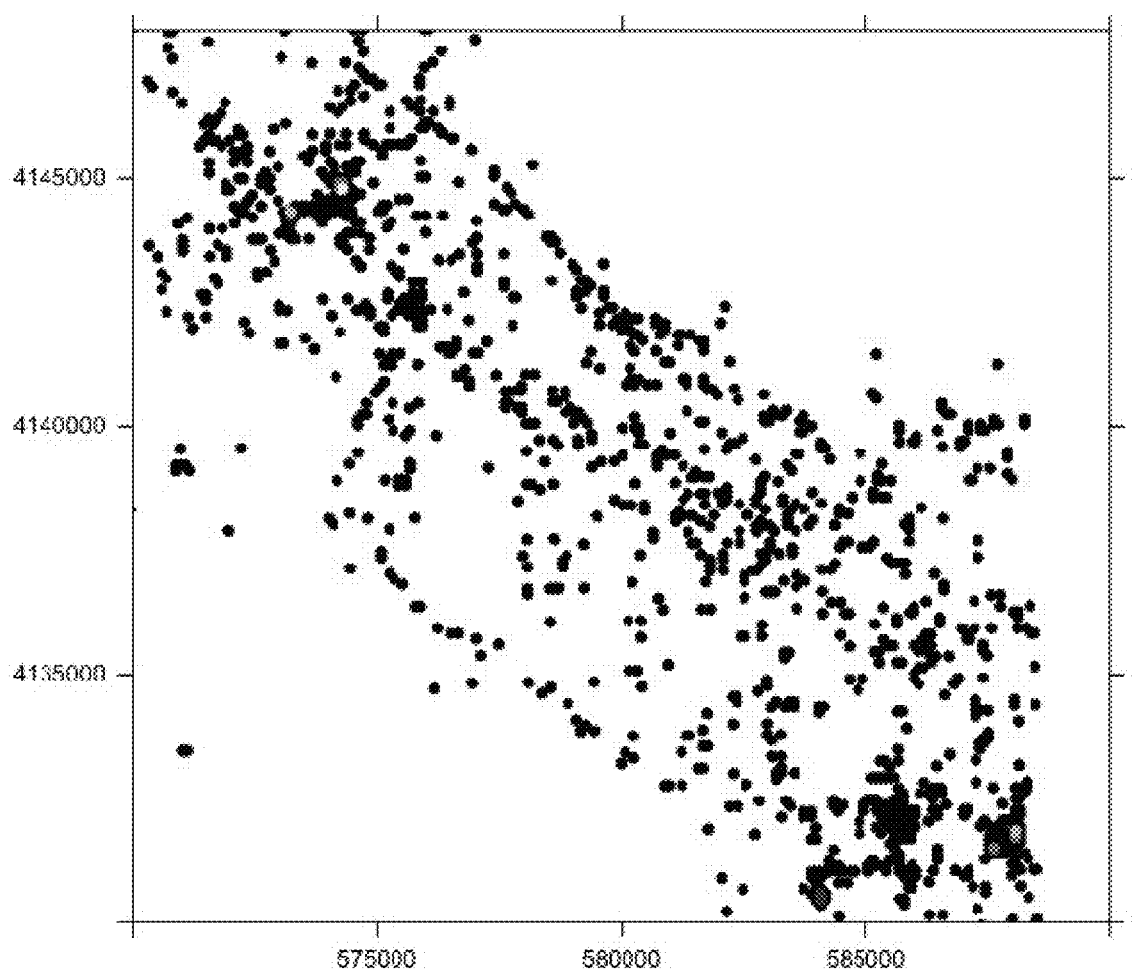
FIG. 11 shows a graph of a sample data set crowd-sourced from app usage data according to an embodiment of the present invention.

FIG. 11 shows an example for app Ai (e.g., the Apple Store app) over the domain of interest G_S (e.g., the San Francisco Bay Area). The number of submissions was counted over a grid of 100 m×100 m and a period of 4 days. That is, the graph shows a 4-day period, as opposed to the 1-day periods shown in FIG. 8. It can be observed from FIG. 11 that Ai usage exhibits spatial clusters and hotspots. There is also random usage (noise) in FIG. 11. It would be beneficial to filter the noise and identify hotspots in a manner that is not computationally prohibitive (i.e., time and/or processing resource intensive) for large datasets. Several examples are described below; however, usage hotspots may be detected other manners.

OGAM

Figure 12:
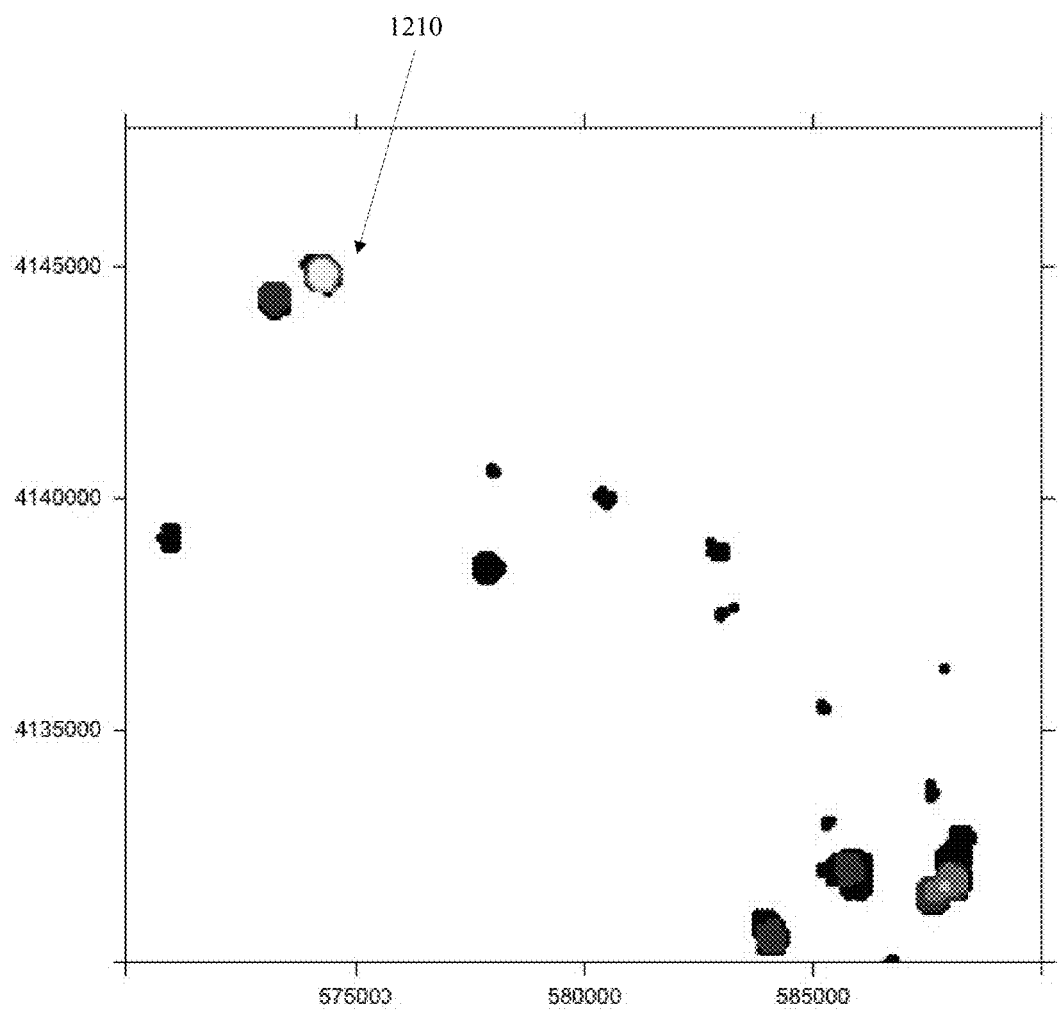
FIG. 12 shows the results of running OGAM on a sample data set according to an embodiment of the present invention.

In one embodiment, hotspots can be detected using Openshaw's Geographical Analysis Machine (OGAM). This technique scans a geographical area with circles of varying sizes testing for localized spatial clustering. FIG. 12 shows the results of running OGAM on the raw data from FIG. 11. As FIG. 12 illustrates, clusters can be identified using OGAM. One such cluster is identified by reference numeral 1210.

However, OGAM may be computationally prohibitive as the data set grows (in number of apps and in geography). For example, as the data domain is expanded, the technique may become computationally prohibitive. Even for a small geographical area (0.25 degree×0.25 degree) and a relatively small set of Apps (approximately 2000), the processing time is on the order of 1 day for a non-distributed DB implementation. Therefore, a faster solution is desirable. Additionally, it appears that OGAM may produce a high number of false positive hotspots.

Kernel Estimation

Figure 13B:
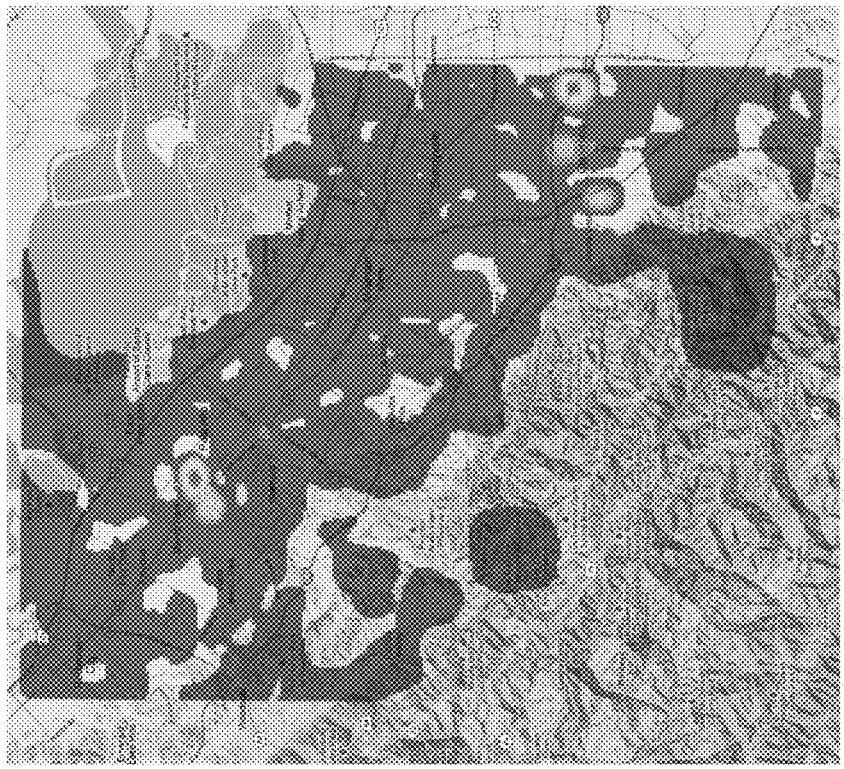
FIG. 13B shows usage intensity estimation using Gaussian Kernel Smoothing and a thresholding according to an embodiment of the present invention.
Figure 13A:
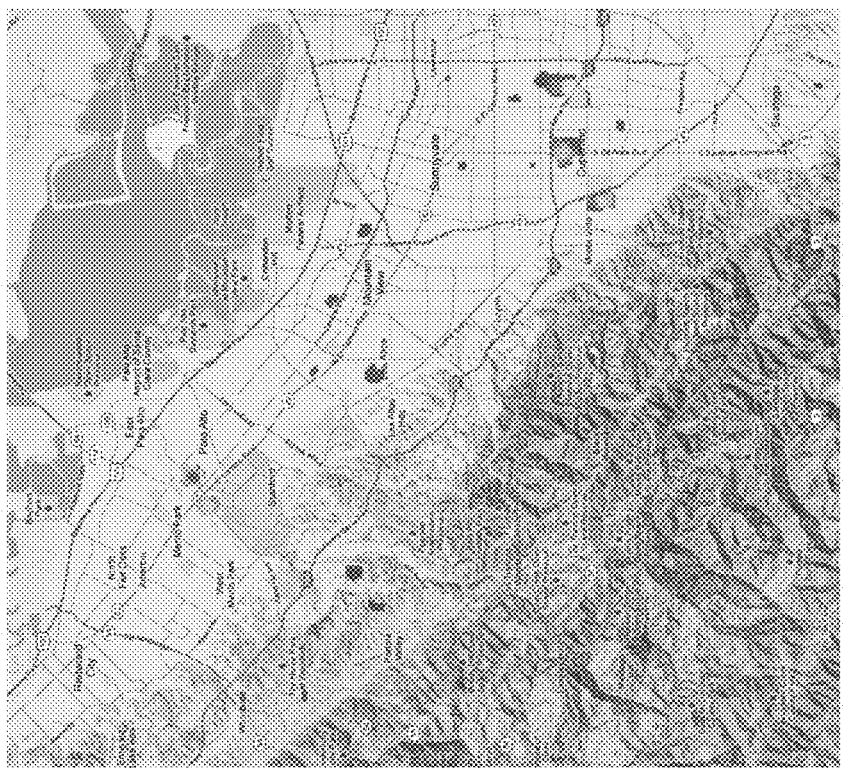
FIG. 13A shows usage intensity estimation using OGAM according to an embodiment of the present invention.

In some embodiments, Gaussian Kernel smoothing and thresholding can be used to identify clusters or hotspots. FIG. 13A shows intensity estimation using OGAM. FIG. 13B shows intensity estimation using Gaussian Kernel Smoothing and a thresholding. Kernel estimation is orders of magnitude faster than OGAM. Kernel estimation can also be more useful than the OGAM method as kernel estimation found less false clusters in areas with low device-population density.

On the other hand, kernel bandwidth has an important influence on the results when using kernel estimation. In some instances, it is difficult to estimate kernel bandwidth for any given app. Additionally, automatic thresholding may become necessary when a large number of apps are processed. In some instances, there may be a need to capture local clusters with a low number of submissions that coexist with clusters showing a very high number of submissions in a given region.

Gaussian Kernel Smoothing and the Laplacian Operator

In some embodiments, Gaussian kernel smoothing and the Laplacian operator can be combined using the associativity property of convolution (e.g., Laplacian of Gaussian), and LoG can be used to identify hotspots. App usage hotspots may be detected by using the Laplacian of Gaussian operator over the estimated intensity in order to find the local extrema (maxima or minima) as the curvature would be negative. The Laplacian is sensitive to noise; therefore it is beneficial to perform thresholding before applying the Laplacian operator. For example, bins that do not have enough counts can be considered to be zero, therefore eliminating local extrema that are due to noise and not actual hotspots. For example, if one bin had ten counts and all neighboring ones had zero, this could result in a high curvature, but the two counts are likely due to spurious usage, and not the result of significant localized usage.

As previously described, the crowd-sourced localized usage data is decimated and aggregated in order to generate submission counts over a spatial grid $G\_s$ ($G\_{st}$ in the space-time case). For each app Ai a set of tuples Tik is generated, with the following structure: Tik: <decimated latitude, decimated longitude, submission count for Ai>.

The dataset $D\_Ai$ includes all the tuples Tk where submission count is greater than a given threshold $S_{min}$. That is, $D\_Ai=\{Ti0, Ti1, \ldots, TiK\}$, where $D\_Ai$ is a dataset of submission counts for a specific app Ai over a spatial grid $G\_s$. Smin is the minimum submission count at any slot of the spatial grid during the time period of interest. Setting an Smin serves several purposes, including preserving privacy of users in low usage areas and de-noising (e.g., removing app usage that is not considered significant).

For example, as in FIGS. 10A and 10B, let app Ai be the "Apple Store" app and $D\_Ai$ be the dataset of submission counts for app Ai over a spatial grid $G\_s$ aggregated over a period of one month. The dataset $D\_Ai$ of decimated and aggregated events for app Ai is shown in FIG. 10A. Again, each square of the grid is approximately ~100 m×100 m (1/1000 of a degree of latitude and longitude) and can be color-coded or otherwise distinguished by submission count. However, it is hard to see where the hotspots are from the raw data.

Here, the objective is to detect hotspots for usage of app Ai based on a dataset $D\_Ai$ (submission counts for app Ai over a spatial grid $G\_s$). This can be broken down into two sub-problems: (1) estimating the spatial distribution Xi of usage intensity for app Ai over $G\_s$ given $D\_Ai$; and (2) then detect local maxima of Xi. One method of approaching the first problem of estimating the spatial distribution Xi of usage intensity for app Ai over $G\_s$ given $D\_Ai$ can be done, for example, as described in subsection (c) (Estimating Local Usage Intensity), above. FIG. 10B shows one embodiment of kernel intensity estimation with a threshold of 7% of max achieved inside the spatial domain. This method uses the formulation of the Gaussian kernel shown in FIG. 9A.

Detecting local extrema of Xi can be accomplished estimating the Laplacian. A formulation of the Laplacian of Gaussian for hotspot detection is shown in FIG. 14A (http://fourier.eng.hmc.edu/e161/lectures/gradient/node10.html).

Figures 14A, 14B:
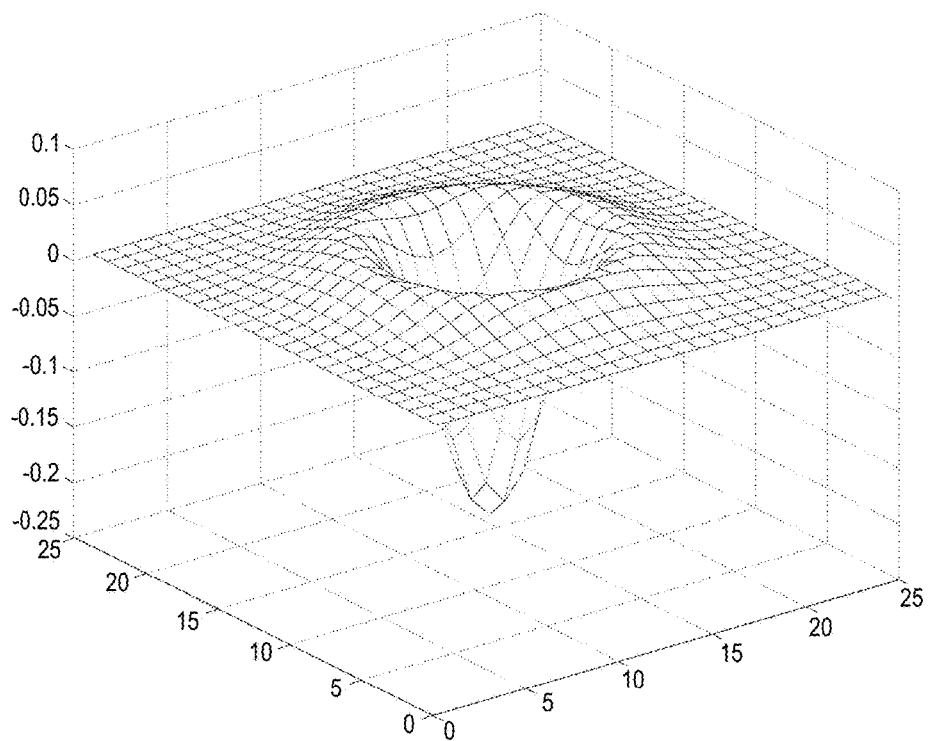
FIGS. 14A and 14B show the Laplacian equation and graph that can be used according to an embodiment of the present invention.

FIG. 14B shows a kernel for hotspot detection. In some embodiments, a discrete Laplacian filter is used so that for every location $Z=(z\_{long}, z\_{lat})$, the second spatial derivative of the app usage intensity is estimated. Using the Laplacian of Gaussian (LoG) can be useful in order to reduce sensitivity to noise.

In some embodiments, preprocessing, such as applying a contrast operator, improves the results of the model. A contrast operator can assist in de-noising the data. For example, in some embodiments, the estimated usage intensity Xi is squared resulting in Yi. That is, for each element of the grid $G\_s$ the squared intensity is used: intensity^2.

Using LoG, local maxima can be detected. That is, the areas where Laplacian is negative are identified as local maxima. In some embodiments, further thresholding is used in order to eliminate spurious Laplacian values that result from thresholding intensity of usage in the previous stage (i.e. Laplacian has to be negative and smaller than a given threshold). In some embodiments, the laplacian is normalized to [0-1] over the regional model. The mapping of laplacian=0 is kept: lap_zero. A hotspot is detected when the normalized laplacian (n_lap) is less than, for instance alpha=0.985, times lap_zero: n_lap<0.985*lap_zero. Other suitable values can be used depending on the application.

Figure 15:
FIG. 15 shows the results of hotspot detection using LoG according to an embodiment of the present invention.

FIG. 15 shows the results of hotspot detection using LoG. The hotspots are circled and labeled for the purposes for illustration. The label represents the corresponding Apple Retail Store locations. As can be seen, the hotspot detection result is very accurate with few false positives. One false positive was identified (e.g., a hotspot was identified for the Apple Store app where there was not an Apple retail store or office); however, this false positive was in an area where increased usage.

The hotspot could also be determined from the raw data or the smoothed data. For example, the bin with a maximum number of counts within a local vicinity could be identified as being the hotspot in the local vicinity. It is also possible that more than one bin could be designated as a hotspot. In a similar manner, a distance of a bin from a hotspot could be taken in account.

Estimating the local usage intensity and identifying hotspots in the manner described above can be useful in a number of applications, including detecting hotspots of app usage for estimating the local relevance of apps, estimating the location of stores associated with a given app for recommending apps at those locations, identifying POIs, detecting hotspots of activities associated to particular app categories, predicting app adoption/usages based on location, and estimating the location of densely populated areas for applications including adaptive tiles for pre-caching geo-relevant content. Using certain embodiments described above, it is possible to determine optimal locations for app promotion and marketing based on the spatio-temporal mining of crowd-sourced localized app usage data, as described in certain embodiments above.

In some embodiments, crowd-sourced spatial distribution of app usage may be combined with web crawling of app websites and points of interest (POI) from maps in order detect apps that are relevant at a specific location. In one embodiment, the locations of stores associated with particular apps may be estimated.

Using certain embodiments described above, it is possible to determine categories of apps that are localized. For example, categories of apps (e.g., travel apps, productivity apps, free apps, games, etc.) may be tagged with location data. This usage data may be analyzed by the app recommendation system. Categories of apps may then be recommended to a user based on location. In some embodiments, certain categories of apps receive a higher ranking in the scoring system. For example, travel apps may be more likely localized apps, as compared to social apps. Therefore, categories of apps can be weighted and ranked.

e. Map-Reduce Convolution for Large Data Sets

Both, app usage estimation and hotspot detection, can be implemented using convolution of the input signal with a kernel (spatial distribution of usage with gaussian kernel, and hotspot detection with a LoG kernel). However, as the domain of interest become large, the number of apps becomes large, and/or the desired resolution becomes high, it may be computationally expensive to estimate intensity and/or identify hotspots over all locations in a domain of interest. Therefore, a technique to process large datasets is needed.

In some embodiments, map reduce convolution may be applied to process large datasets in parallel and estimate intensity over a large number of apps and/or a large domain of interest. In some embodiments, convolution may be performed using a map reduce method for performing convolution on large datasets. MapReduce is a programming model for processing large data sets, as the processing can be distributed on clusters of computers, for instance using Apache Hadoop (http://en.wikipedia.org/wiki/MapReduce). Using MapReduce convolution the sparseness in event-driven data can be exploited, this approach contrasts with the familiar image kernel convolution problem. In short, there is a large domain which contains some areas that are sparse and some areas dense. A problem to be solved is: how to perform convolution in parallel over this dataset?

In some embodiments, map-reduce convolution can be performed on a dataset D with a given kernel K. Convolution can include a map stage and a reduce stage. In the map stage, the distributive property of convolution can be exploited: if D can be separated into two signals D0 and D1, such that D=D0+D1, then its convolution can be computed as D*K=D0*K+D1*K. Furthermore, if the dataset contains N locations, D can be divided into N convolutions, one for each location. At each location the convolution can be simplified to the generation of a translated and scaled version of the kernel K, given that convolution of an impulse with a kernel K results in a translated version of the kernel K. The number of submissions is used as the scale factor for the amplitude of the impulse.

The algorithm: for each point Pi in D generate a scaled version of K centered at the location Li of Pi (1 point generates a set of points at neighboring locations). For each Pi: <lat, long, v> generate: Qj={ . . . <(lat −1), long, c(0,−1)>, <lat, long, c(0,0), <(lat+1), long, c(0,1)> . . . }. In the reduce stage, group all the generated points Qj by location and compute the sum of the convolution results obtained in the Map stage: Group Qj by <lat, long> and compute the sum of the convolutions computed in the map stage. The result is the convolution of dataset D and kernel K. One advantage of map reduce convolution is scalability. Convolution may be done on a world scale for device population at very high resolution (e.g., using a Hadoop cluster). By changing the kernel function different goals can be achieved: from smoothing to edge detection and more.

f. Ranking Apps Based on Local Relevance

Given the thousands of apps available, it is likely that even after de-noising and thresholding there will be more apps observed at a given location than what it would be desirable to recommend, even at very high resolutions. Also there are apps with pervasive usage that could make it into too many grids, hurting the discovery component of the recommendation system. For this reason, it is beneficial to implement a ranking function based on the attributes derived from the spatio-temporal distribution of app usage in such a way that recommendations are locally relevant. Apps may be ranked based on their local relevance and other information. For example, the spatial distribution of an app A in a region can indicate how specific is app A to location. That is, is usage of app A found everywhere in the San Francisco Bay Area? Is the usage found uniformly across many locations in a domain of interest? Or, is app A only, or mostly used, at a particular location? Therefore, a technique for separating apps with a high, uniform usage distribution across all or many areas in the domain of interest from apps that are truly localized (i.e., used a frequently some locations and infrequently, or not at all, at other locations).

Figure 16:
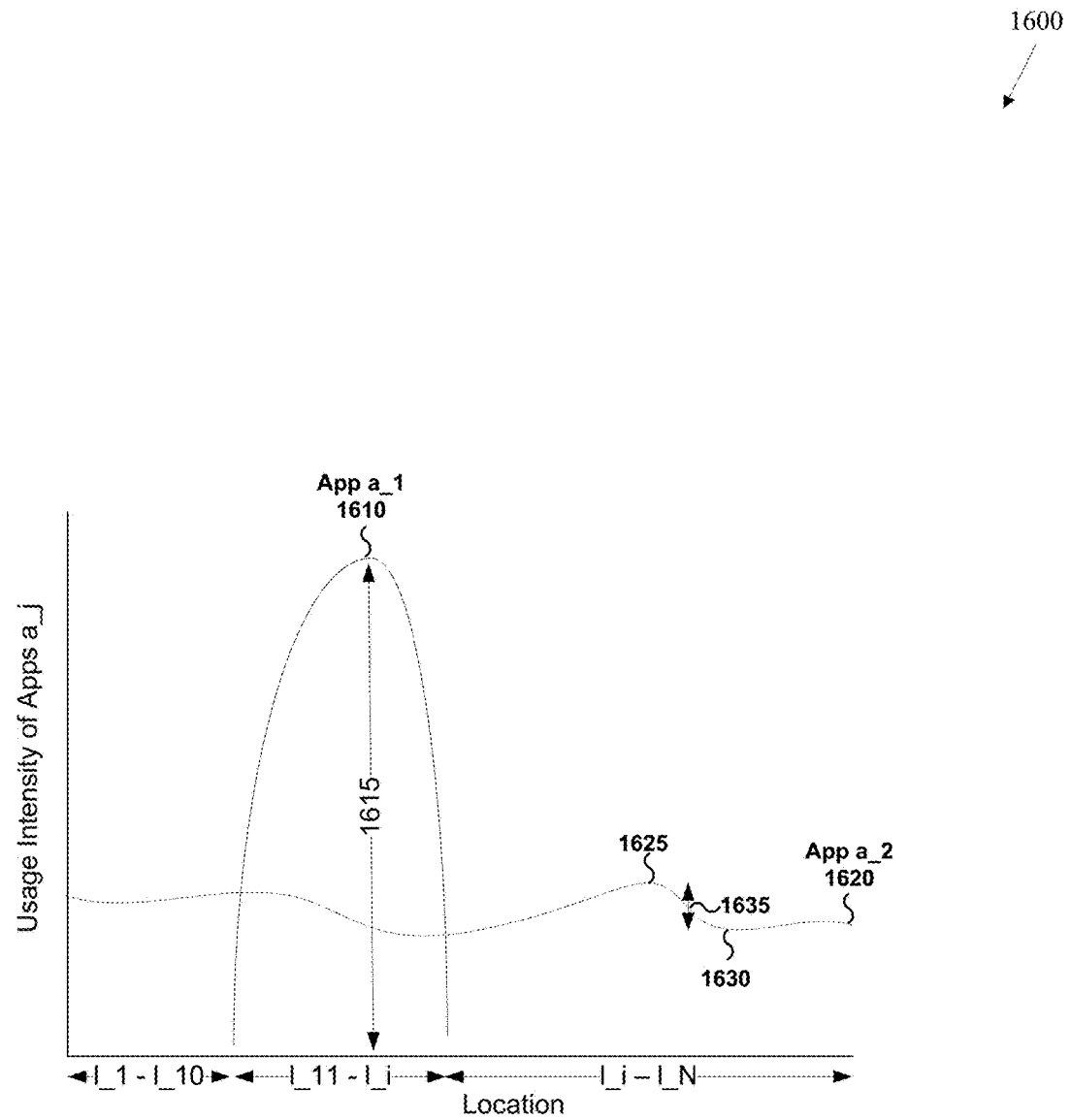
FIG. 16 shows a sample histogram of intensity of usage for various apps over a domain of interest according to an embodiment of the present invention.

At a high level, app usage intensity can be analyzed across space bins to distinguish between apps with a relatively uniform usage distribution and apps with localized usage distribution. If the variance in usage intensity over a domain of interest is low (e.g., below a threshold), then the app is not very localized. If the variance in usage intensity over a domain of interest is high (e.g., above a threshold), then the app might be localized. FIG. 16 shows an example of a histogram of the usage intensity of two apps a_1 and a_2 at each location l_1 through i_N over a domain of interest. The app usage intensity data for app a_1 (intensity curve 1610) exhibits highly localized qualities in that from l_1-l_10 there is little or no app usage, from l_11-l_i there is a spike in app usage, and from i_i-l_N there is little or no app usage. The app usage intensity data for App a_2 (intensity curve 1620) does not exhibit localized qualities in that there is only minor variance in intensity over the domain of interest.

Distinguishing between localized apps and non-localized apps can occur in a variety of ways. In some embodiments, there can be a minimum threshold from the peak to the trough of the intensity curve. For example, intensity curve 1610 has a larger peak-to-trough value (1615) than intensity curve 1620, which from peak 1625 to trough 1630 is relatively small (1635). In some embodiments, apps that have a high usage over a predetermined number of locations in the domain of interest may be determined to be non-local. In some embodiments, apps that have high usage over multiple large regions may not be recommended as local apps because the app usage, although it may be high, is not locally significant. For example, certain social networking apps likely exhibit use intensity that is relatively uniform across a domain of interest and does not exhibit localization. If usage of an app is observed in a threshold number of locations in a domain, these apps may be considered non-local. Taking a simplified example, if a domain of interest has 100 location bins and a particular app is observed in 75 of the location bins, that app is used more or less uniformly over the domain of interest and it does not exhibit localized qualities. In some embodiments, if a threshold percentage of location bins have statistical significant app usage, then the app is considered to have a relatively uniform distribution and therefore is considered to not be a localized app.

In some embodiments, the components a ranking model could include: (1) spatial entropy of app usage, which can be estimated from the conditional probability of location given app (hal_aj); (2) prior probability of a given app based on the marginal probability: P(aj); (3) local entropy based on the joint probability of app and location (−fij*LOG(fij)); (4) local usage; and (5) a temporal component, such as probability of usage over time, estimated from number of days of observed significant usage of app aj at a given location These components are provided for illustration purposes only. One or more of the components listed may be omitted and/or other added without departing from the scope of the present invention.

Various other methods can be used to identify apps with constant, uniform usage over a domain of interest and distinguish them from apps with localized qualities. One method is described in more detail in FIG. 17.

Figure 17:
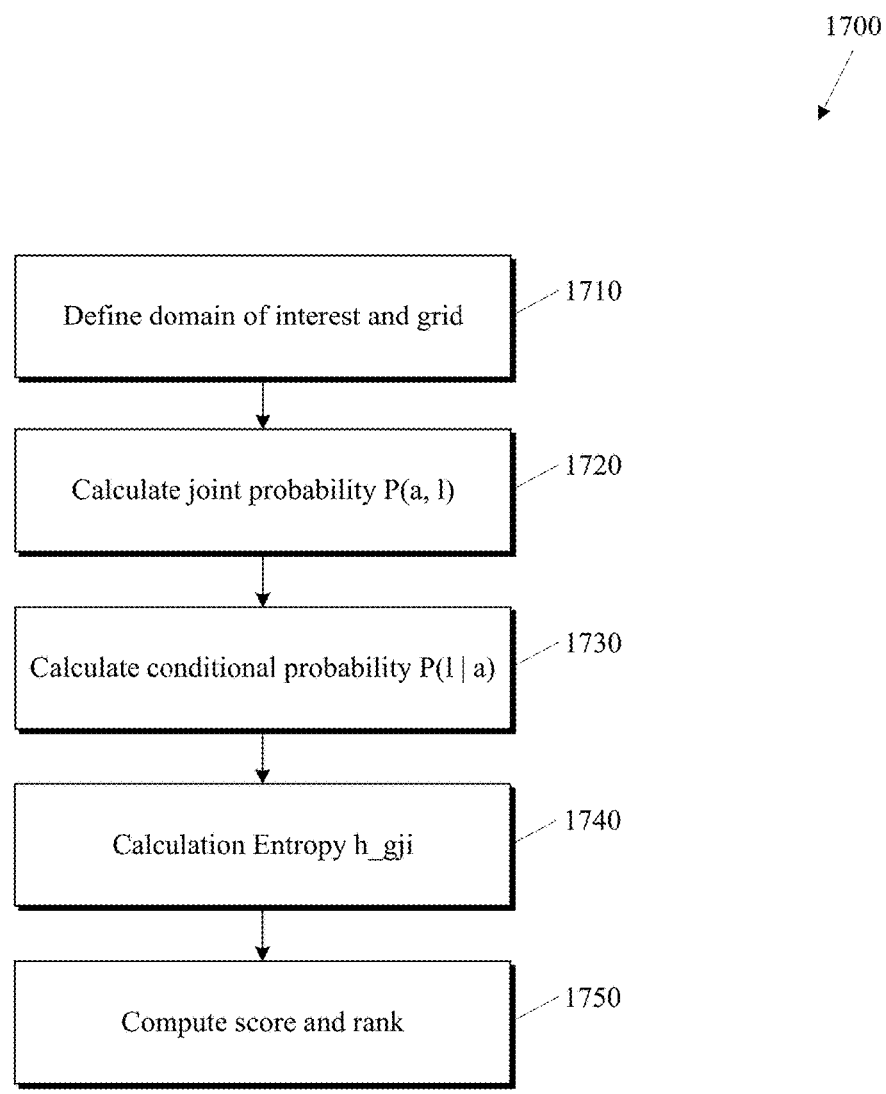
FIG. 17 shows a high-level flow diagram of a method of analyzing crowd-sourced data according to an embodiment of the present invention.

FIG. 17 illustrates a high-level flow diagram of one embodiment of method 1700 for ranking apps in accordance with the present invention. Method 1700 can include defining a domain of interest and a grid 1710. For example, a grid with 50 meter square cells can be defined over the domain of interest (e.g., the world). Other suitable cell sizes can be used. There can be a tuple for each app at each cell in the grid with app usage data. For example, each 50 m by 50 m location/cell might have a tuple for each app that includes app usage data, such as an App ID, Usage Intensity for that App at that location, a Laplacian for that location, a number of days app usage was observed at that location, and other suitable app usage data.

Method 1700 can include calculating a joint probability P(a, l) 1720. That is, for each location 1 in the grid, what is the probability that app a is used in that cell/location? A table 1800 with the joint probabilities for each app and location combination over a domain of interest is shown in FIG. 18. Each cell in the table has a joint probability of having a usage of App a_j at location l_i. This can be represented by the usage intensity of app a_j at location l_i divided by the total usage.

Figure 19:
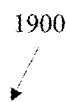
FIG. 19 shows a sample table of conditional probabilities according to an embodiment of the present invention.
Figure 21:
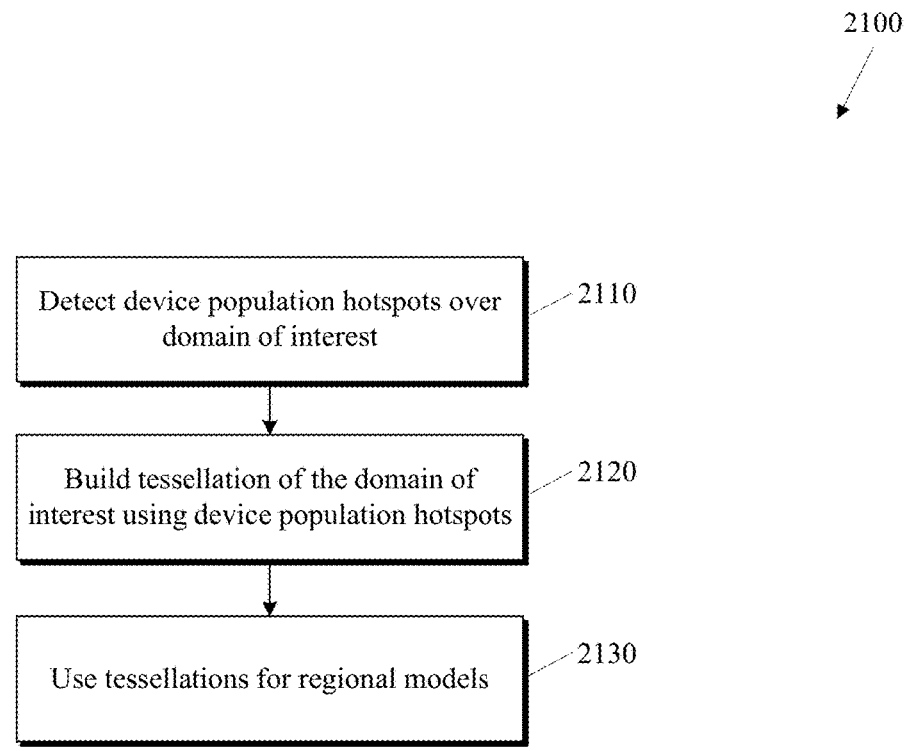
FIG. 21 shows a high-level flow diagram of a method of generating tessellations according to an embodiment of the present invention.

Method 1700 can include calculating a conditional probability P(l|a) 1730, the conditional probability of a location given an app. A table 1900 with the conditional probabilities over a domain of interest is shown in FIG. 19. For example, for each app observed in a particular location, the conditional probability distribution of a location given an app may be estimated. The conditional probability of being at a location given a particular app is helpful in recommending apps to users. The conditional probability can be derived by applying Bayes theorem to the joint probability from block 1720. That is, the conditional probability of being at location l_i given app a_j (i.e., P(l_j|a_i)), is the joint probability over the marginal probability. The marginal probability being P(a_i), where P(a_i) is the sum of all j=0 through j=N of the joint probabilities P(a_i, l_j).

Method 1700 can include calculating entropy h_gji 1740. Based on the conditional probability, the entropy of having the particular app at this location may be estimated and compared to the regional spatial entropy of the particular app. For example, the entropy of specific app A at a given location X may be estimated. This estimated entropy may be compared to the regional spatial entropy of app A. If the localized entropy and the regional entropy are similar, then, the app may not be highly localized. In some embodiments, entropy h_gji can be calculated based on the equation shown in FIG. 20A.

Method 1700 can have ranking 1750 based on entropy h_gji, conditional probability, and other data. That is, a ranking score may be based on usage intensity, spatial entropy, and the like. In some embodiments, a score can be formulated as shown in FIG. 20B: $Usage^{\alpha}*(F\_ij*Log(f\_ij)/h\_a1\_aj*P(a\_j))^{\beta}*Days\_Observed^{\gamma}$. Therefore, at each location l_i, an app_j has a local relevance score. At each location, apps of interest can be sorted in descending order based on this score. In some embodiments, the top 25 (or other suitable threshold) are selected for recommendations at each location in the domain of interest.

In some embodiments, app meta data can be used in the ranking process. Certain categories of apps may be more, or less, likely to be locally relevant. For example, travel related apps might be locally relevant to an airport or train station, but social apps are probably not locally relevant. In some embodiments, user feedback after an app recommendation can be incorporated into the scoring algorithm for ranking future apps. For example, if a first app was recommended to a first user for a particular location and the first user downloaded and used the first app, this information can be used to provide a second user with a recommendation (e.g., by increasing the score of the first app in the ranking system). Conversely, For example, if a second app was recommended to a first user for a particular location and the first user did not downloaded or use the second app, this information can be used to provide—or decide not to provide—a second user with a recommendation (e.g., by decreasing the score of the second app in the ranking system).

g. Device Population Estimation

Device population analysis may optionally be performed for improving the accuracy of the app recommendation engine. The unique number of submissions may be counted over the defined grid, in order to estimate the device population distribution. From this, the space distribution or spatio-temporal distribution of device population is estimated from the unique submission counts. A smoothing function such as Gaussian Kernel Smoothing may be used to estimate device population in a similar manner to determine app usage intensity, as described above.

Device population may be used to normalize submissions across densely populated areas as compared to less densely populated areas. Normalizing app usage intensity with estimated population density before running hotspot detection allows hotspot detection to be less sensitive to increased usage that is just related to higher population density. For example, a first app where 900 out of 1000 devices are using the first app in a particular location might be considered more localized than a second app where 10,000 out of 100,000 devices are using the second app at the particular location. That is, a higher percentage of app usage across population density may indicate a higher degree of localization.

In one embodiment, population density and demographics may be estimated from crowd-sourced geo-localized app usage data.

h. Regional Models Using Tessellations

In some applications a subdivision of the world into regional models is needed in order to handle properly variations in app usage at different geographical scales (for instance between countries that speak different languages).

Simply using a coarser grid would result in metropolitan areas with similar use patterns been split at inconvenient locations, hurting the regional model statistics. Moreover, different applications have different requirements on the properties of such division.

In some embodiments, tessellations can be used to separate large urban areas from other less dense regions. For example, it might be beneficial for an urban area, such as the San Francisco Bay Area, to be part of a different regional model than the Lake Tahoe area, even though geographically the two areas are not very far apart on a worldwide scale. It is expected, for example, that app usage is far more intense in San Francisco as compared to Tahoe. However, this does not imply that app usage in the Tahoe area is not locally significant. For example, 100 app usage submissions in the Tahoe area can be just as locally significant as 10,000 in San Francisco area. Dividing the domain of interest into regional models in a meaningful way can give significance to usage in low density areas and/or de-weight usage in high density areas. In a way, generating meaningful divisions of the domain of interest can normalize usage data across regions. Therefore, it is beneficial to divide the domain of interest into regional models such that the statistics in the regions are sufficiently homogenous (e.g., a region typically should not divide otherwise similar data points).

In some embodiments, device population density can be used to efficiently subdivide the universe of data into regional models. Nevertheless it is often hard to get up-to-date and/or accurate estimates of such population density at the proper resolution. Therefore, a coarse regular grid is used, e.g. 1 degree of latitude×1 degree of longitude, may be used for simplicity. This can result in undesirable artifacts. For instance, large metropolitan areas are split at inconvenient locations, and this may hurt the regional model properties for further analysis.

Applications on spatio-temporal modeling would benefit from tessellations that incorporate population density in the process of creating the geometry of its cells. In this way the models can properly handle variations in population density at different geographical scales. Tessellations can be used to create subdivisions of a spatio-temporal domain based on the population density estimated from crowd sourced location data.

An exemplary application of dividing the dataset into regional models using tessellations could be: (1) collecting and analyzing crowd source data, as described herein; (2) removing the application element; (3) detecting hotspots for device population (rather than app usage) according to the methods described herein; and (4) creating adaptive, non-uniform regions using tessellation techniques based on population. The adaptive non-uniform regions can used, for example, to define the bins that are used for collecting and/or analyzing app usage data.

In some embodiments, a subdivision of the world into regional models can be done by identifying the local hotspots of device population using the same method used for determining hotspots (described above). The set of identified hotspots can be used as the input for building a tessellation of the domain of interest (e.g., the world).

In some embodiments, tessellations of the domain of interest are generated using a Voronoi diagram with the device population hotspots as seeds. A Voronoi diagram is a way of dividing a domain of interest space into a number of regions. A set of points (called seeds or generators) can be specified beforehand and for each seed there will be a corresponding region, or call, consisting of all points closer to that seed than to any other. In some embodiments, the resulting cells (polygons in the 2D case) can be the regional models.

Figure 22:
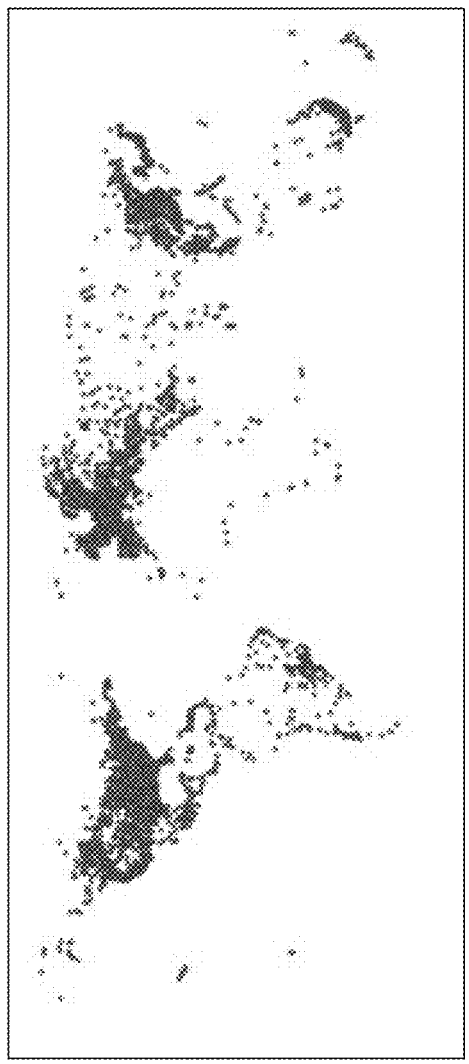
FIG. 22 shows detected device population hotspots according to an embodiment of the present invention.

At block 2110, device population hotspots can be detected using methods described herein. FIG. 22 illustrates an example of detected device population hotspots in a graph 2200. Hotspots can be detected using any suitable method. For example, hotspots for device population are identified from crowd-sourced data using local maxima detection over the spatio-temporal distribution of device usage. In some embodiments, the usage data is decimated and aggregated at a relatively high resolution compared to the final tessellation (e.g., at least one order of magnitude higher). Then, Laplacian of Gaussian can be used over the predictive spatio-temporal distribution for detecting local maxima. Additional details on hotspot detection is described above.

Figure 23:
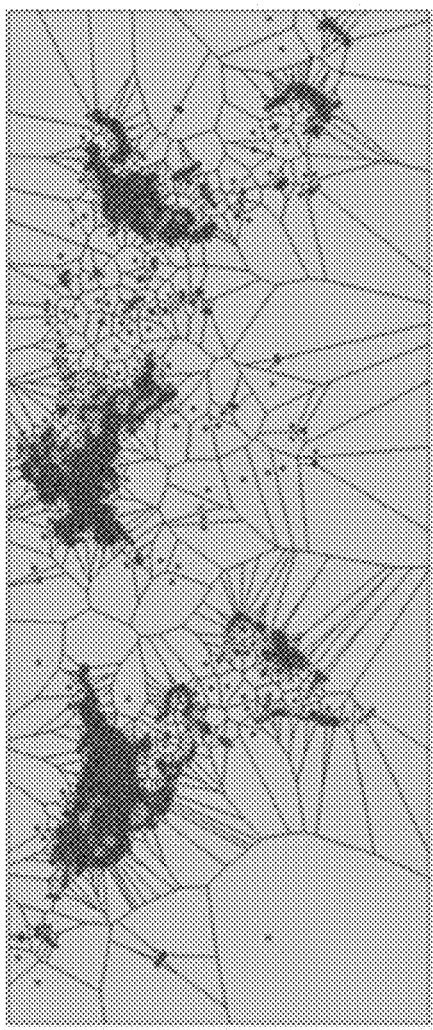
FIG. 23 shows a Voronoi Tessellation based on detected hotspots according to an embodiment of the present invention.

At block 2120, the set of hotspot locations can used as the generators (seeds) for building a tessellation. In some embodiments, this can be implemented using a Voronoi tessellation algorithm. FIG. 23 illustrates a Voronoi Tessellation based on the hotspots detected at block 2110 in a graph 2300 and graphed in FIG. 22. The Voronoi diagram in FIG. 23 exhibits some desirable properties, including all the generated polygons are convex (when using Euclidian distance) and there is one polygon for each population hotspot. Nevertheless points in continental boundaries generate polygons that are too big because there is no close point with data in the direction of the ocean. For example, a polygon for San Francisco might extend far out into the Pacific Ocean and this may be undesirable for the application. Therefore, the diagram might not be practical for applications that need to estimate local statistics, such as providing locally relevant app recommendation (or for caching or pre-loading locally relevant content).

Figure 24:
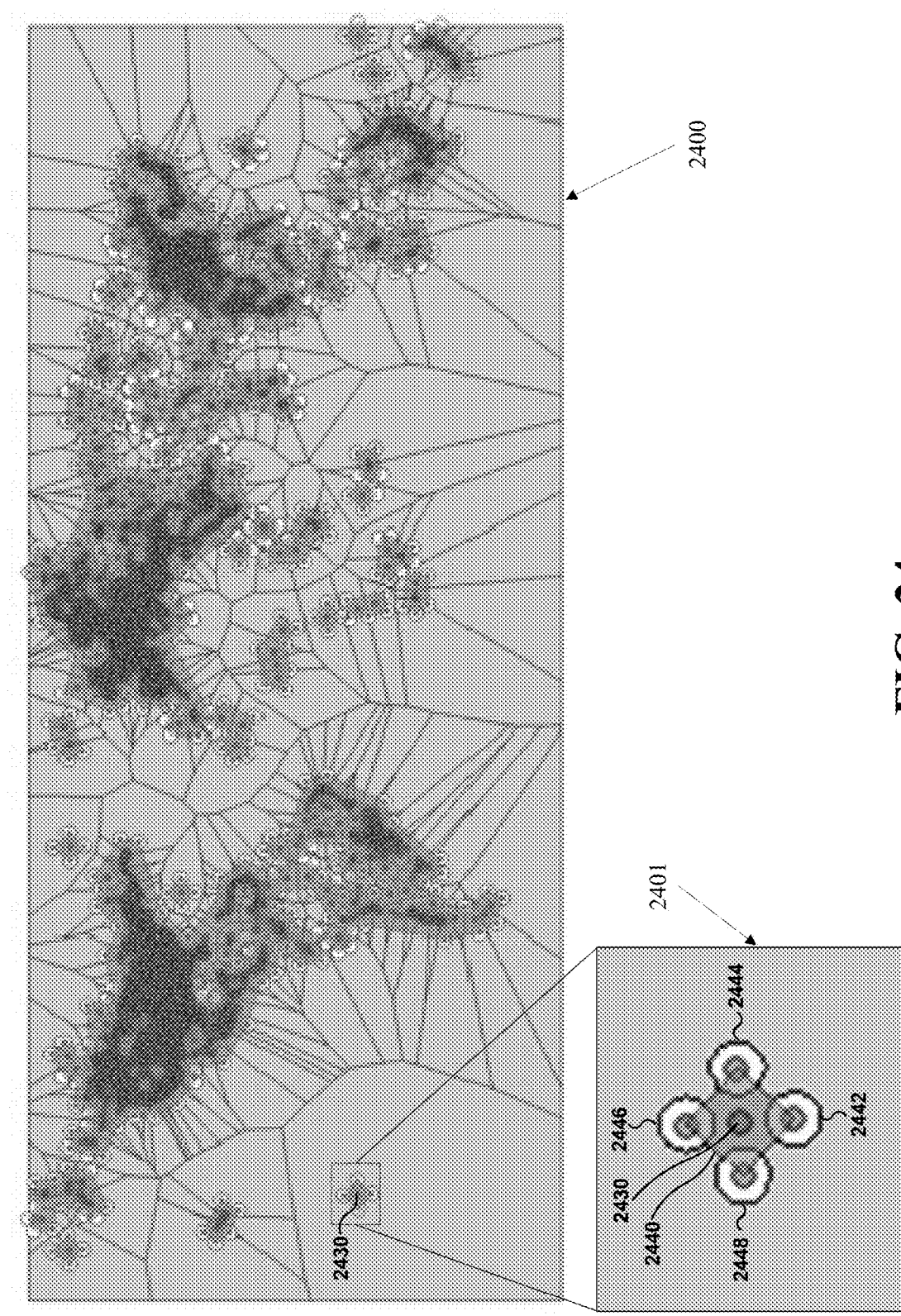
FIG. 24 shows adding a polygonal buffer to the detected hotspots to improve the tessellation according to an embodiment of the present invention.

In some embodiments, a tessellation can be improved by estimating continental boundaries. An embodiment of estimating the continental boundaries is illustrated in FIG. 24. A tessellation of the world 2400 is shown in FIG. 24. In some embodiments, continental boundaries can be estimated by first creating a polygonal buffer Pi around each hotspot Hi with radius R_h.

Next, the union of all the polygons Pi can be performed, resulting in a multi-polygon Q. A simplified polygon M can be generated from Q using a standard polygon simplification algorithm. Vertexes Vj of all the polygons in M can be extracted and are used as candidates for additional seeds in the Voronoi diagram.

In some embodiments, a filtered list of additional points (Fk) is generated by processing the list of candidate points Vj (vertices of all the polygons in Q). A circle Ci centered at each point Vj with radius R_t can be generated, where R_t is the threshold for merging multiple points. Next, merge points associated by X intersecting circles (Ci). Multiple point merge can be implemented by computing the centroid of the X points to be merged. Then, insert each point Fk into the original tessellation and mark them as "no-data" points.

For the purposes of illustration, take hotspot 2430. Hotspot 2430 represents app usage in and around islands in the Pacific Ocean. See zoomed view 2401. A polygonal buffer 2440 is created around hotspot 2430 creating a polygonal buffer at a predetermined distance R_h from hotspot 2430. The polygon can be simplified to a polygon with vertices 2442, 2444, 2446, and 2448 (or the simplified polygon can be generated in the first instance eliminating the simplify polygon step). Simplified polygonal buffer 2440 is shown as a square but any suitable polygon algorithm could be used to generate a suitable polygon. No data points 2442,

2444, 2446, and 2448 can be inserted into the original tessellation to generate a modified tessellation. They are referred to as "no data" points because they are not associated with an actual calculated hotspot, rather a buffer around a hotspot.

Figure 25:
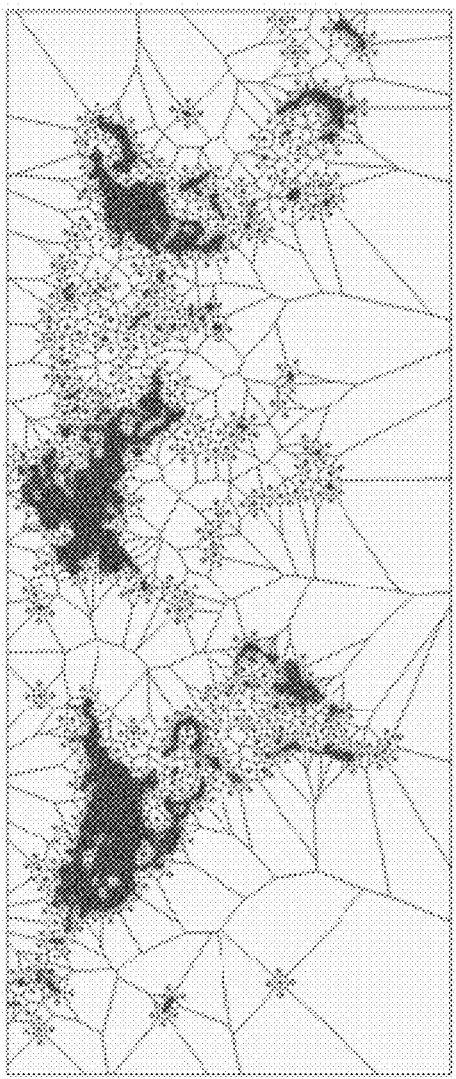
FIG. 25 shows another Voronoi Tessellation based on detected hotspots and the polygonal buffer according to an embodiment of the present invention.
Figure 26:
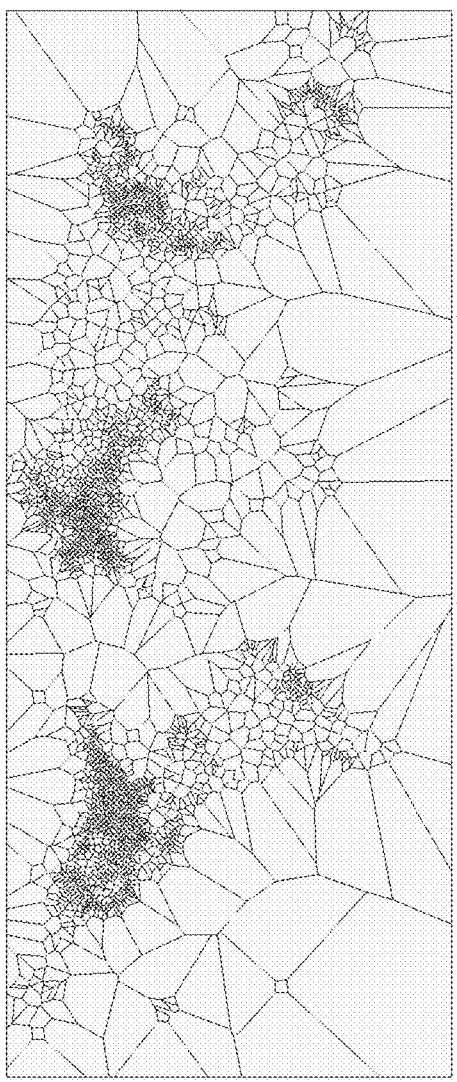
FIG. 26 shows the same tessellation with the hotspots and polygonal buffer removed.

FIG. 25 shows the improved tessellation 2500 together with the original hotspots (gray) and the additional (no-data) points added. The adaptive tessellation alone is shown in FIG. 26. Note that each polygon has an associated population hotspot statistic ("no data" for the artificially added points to improve the tessellation for real-world localization applications). In some embodiments, using this data the Voronoi diagram can be further processed, for example, by removing "no data" polygons or merging some cells.

At block 2130, the tessellation can be used for various applications. In some embodiments, the tessellation can be used for spatio-temporal modeling with adaptive resolution based on population density. In some embodiments, each of the cells in the tessellation can be used for a regional model for providing localized application recommendations. Non-uniform spatio-temporal tessellations based on crowd-sourced location data may be applied to other embodiments of the present invention.

In some embodiments, subdivision may be required in order to pre-cache/pre-load data to mobile devices since usually more data needs to be pre-cached/pre-loaded for densely populated areas than for rural areas. In this case the size of the tessellation cell should adapt inversely proportional to population density. Therefore, tessellations may be used to determine how to partition domain of interest for aggregation in order to partition domain of interest into tiles for delivery to user device (e.g., an asynchronous delivery mechanism). Some embodiments of an asynchronous delivery mechanism are described in U.S. patent application Ser. No. 13/843,291, described above.

In some embodiments, the method can be used for creating an adaptive mesh for pre-caching WiFi access point information, cellular antennas, Bluetooth® access points, or similar beacons or transceivers. For example, instead of using the device distribution, the number of access points can be used so that the mesh adapts to the access point density.

One having skill in the art will recognize that there are other applications for non-uniform spatio-temporal tessellations based on crowd-sourced location data in accordance with embodiments of the present invention.

V. Privacy

The present disclosure contemplates that privacy is important to users of mobile devices. Therefore, embodiments of the present invention take privacy considerations into account while providing relevant app recommendations. The goals of preserving user privacy and providing accurate, relevant app recommendations to users are aligned. For example, the value of crowd-sourced app usage data here materializes when there is sufficient data from many different users to show meaningful and statistically significant data (eliminating noise). In this context, a lone user's location and app usage—in isolation—is not helpful. Additionally, in certain embodiments, it is not necessary to have extremely precise location data. Accordingly, embodiments of the present invention contemplate privacy preserving rules.

As described above, one aspect of the present technology is the gathering and use of location data available from various sources to recommend apps that may be of interest to users. The present disclosure recognizes that the use of such location data in the present technology can be used to the benefit of users. For example, the location data can be used to better understand user behavior, facilitate and measure the relevance of applications, advertisements and delivered content. Accordingly, use of such location data enables calculated control of the delivered content. For example, the system can reduce the number of times a user receives a recommendation for a particular application and can thereby select and deliver content that is more meaningful to users. Such changes in system behavior improve the user experience. Further, other uses for location data that benefit the user are also contemplated by the present disclosure.

The present disclosure further contemplates that the entities responsible for the collection, analysis, disclosure, transfer, storage, or other use of any location data should implement and consistently use privacy policies and practices that are generally recognized as meeting or exceeding industry or governmental requirements for maintaining location data private and secure. For example, location data should be collected for legitimate and reasonable uses of the entity and not shared or sold outside of those legitimate uses. Further, such collection should occur only after the informed consent of the users. Additionally, such entities would take any needed steps for safeguarding and securing access to such location data and ensuring that others with access to the location data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, location data. That is, the present disclosure contemplates that hardware and/or software elements can be provided to prevent or block access to such location data. For example, in the case of application recommendation services, the present technology can be configured to allow users to select to "opt in" or "opt out" of participation in the collection of location data during registration for services. In another example, users can select not to provide location information for application recommendation services. For example, devices of users that opt-in for localized app recommendation features will tag location data to app usage when privacy preserving rules (PPR) are met. Device-side, the localized App usage data may be anonymized and submitted to the app recommendation system for further processing. In another example, app developers may be provided with the capability to "opt in" or "opt out" of localized app recommendations for particular apps that they develop. In yet another example, users can configure their devices or user terminals to prevent storage or use of cookies and other mechanisms from which location data can be discerned. The present disclosure also contemplates that other methods or technologies may exist for blocking access to their location data.

Therefore, although the present disclosure broadly covers use of location data to implement one or more various disclosed embodiments, the present disclosure also contemplates that the various embodiments can also be implemented without the need for accessing such location data. That is, the various embodiments of the present technology are not rendered inoperable due to the lack of all or a portion of such location data. For example, content can be selected and delivered to users by inferring preferences based on non-personal information data or a bare minimum amount of personal information, such as the content being requested by the device associated with a user, other non-personal information available to the content delivery services, or publically available information.

VI. Exemplary Server System

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software. The various participants and elements described may operate or use one or more computer apparatuses to facilitate the functions described herein. Examples of such subsystems or components are shown in FIG. 27, which may illustrate parts of a computer apparatus.

Figure 27:
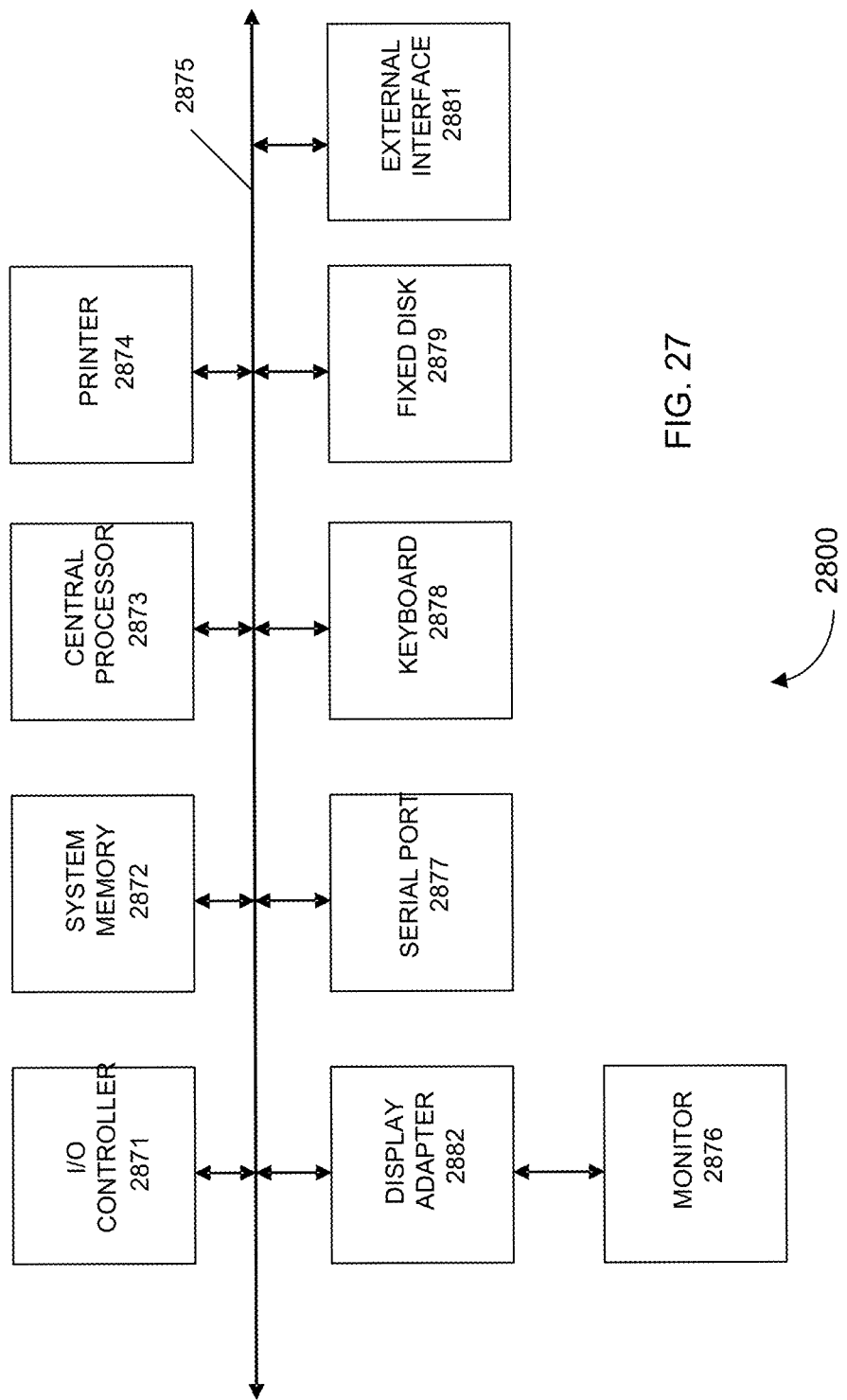
FIG. 27 shows an example a computer apparatus that may be used in accordance with embodiments of the present invention.

The subsystems shown in FIG. 27 are interconnected via a system bus 2875. Additional subsystems such as a printer 2874, keyboard 2878, fixed disk 2879 (or other memory comprising computer-readable media), monitor 2876, which is coupled to display adapter 2882, and others are shown. Peripherals and input/output (I/O) devices, which couple to I/O controller 2871, can be connected to the computer system by any number of means known in the art, such as serial port 2877. For example, serial port 2877 or external interface 2881 can be used to connect the computer apparatus to a wide area network such as the Internet, a mouse input device, or a scanner. The interconnection via system bus allows the central processor 2873 to communicate with each subsystem and to control the execution of instructions from system memory 2872 or the fixed disk 2879, as well as the exchange of information between subsystems. The system memory 2872 and/or the fixed disk 2879 may embody a computer-readable medium.

Any of the software components or functions described in this application, may be implemented as software code to be executed by a processor using any suitable computer language such as, for example, Java, C++ or Perl, using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method comprising:
   identifying, by an application recommendation system, a region over a geographical area for which a statistical value measuring a localized usage of a first application is calculated;
   receiving a plurality of application usage records from a plurality of mobile devices for the region, wherein the plurality of application usage records each comprise an application identifier corresponding to an application;
   analyzing, by the application recommendation system, the plurality of application usage records to determine first application usage records from the plurality of application usage records for the first application;
   calculating the statistical value measuring the localized usage of the first application within the identified region over the geographical area relative to a plurality of other regions;
   comparing the calculated statistical value to a threshold;
   in response to the calculated statistical value exceeding the threshold, identifying the first application as locally relevant to the region over the geographical area;
   receiving a request from a first user for an application that is locally relevant to the region; and in response to receiving the request from the first user, providing the first application that is identified as locally relevant to the region to the first user as a recommendation.

2. The method of claim 1, wherein the first application is provided to the first user as the recommendation when the first user is at the region over the geographical area.

3. The method of claim 2, wherein the first application is provided to the first user as the recommendation when the first user is at the region over the geographical area at a particular time.

4. The method of claim 1 further comprising:
providing the first application to the first user as the recommendation when the first user submits a search relating to the region over the geographical area.

5. The method of claim 1, wherein the region over the geographical area is defined as a polygon on a two dimensional map.

6. The method of claim 1, wherein the application recommendation system is distributed across a plurality of server computers, wherein the plurality of server computers utilize map reduce convolution to calculate the statistical value measuring the localized usage at a respective location relative to other locations.

7. The method of claim 1, wherein the plurality of application usage records of the plurality of mobile devices are provided according to privacy rules of the plurality of mobile devices.

8. The method of claim 1, further comprising identifying a hotspot of the first application in the region over the geographical area when the statistical value exceeds the threshold.

9. The method of claim 1 further comprising:
decimating the plurality of application usage records received from the plurality of mobile devices in space and time such that a resolution of the plurality of application usage records is reduced.

10. The method of claim 1 further comprising:
detecting a set of device population hotspots over the geographical area by:
determining an extrema of a population density of the plurality of mobile devices; and
identifying the extrema as the set of device population hotspots of the plurality of mobile devices.

11. The method of claim 10, wherein in response to the first user entering a detected hotspot, providing a notification to the first user for a recommended application corresponding to the detected hotspot.

12. The method of claim 3, wherein the plurality of application usage records each further comprise a usage timestamp corresponding to an execution of the application, and wherein the plurality of application usage records have a timestamp within a predetermined time window.

13. A non-transitory computer readable storage medium having program code stored thereon, the program code including instructions that, when executed by a processor in a device, cause the processor to execute a method comprising:
identifying, by an application recommendation system, a region over a geographical area for which a statistical value measuring a localized usage of a first application is calculated;
receiving a plurality of application usage records from a plurality of mobile devices for the region, wherein the plurality of application usage records each comprise an application identifier corresponding to an application;
analyzing, by the application recommendation system, the plurality of application usage records to determine first application usage records from the plurality of application usage records for the first application;
calculating the statistical value measuring the localized usage of the first application within the identified region over the geographical area relative to a plurality of other regions;
comparing the calculated statistical value to a threshold;
in response to the calculated statistical value exceeding the threshold, identifying the first application as locally relevant to the region over the geographical area;
receiving a request from a first user for an application that is locally relevant to the region; and
in response to receiving the request, providing the first application that is identified as locally relevant to the region to the first user as a recommendation.

14. The non-transitory computer readable storage medium of claim 13, wherein the first application is provided to the first user as the recommendation when the first user is at the region over the geographical area.

15. The non-transitory computer readable storage medium of claim 14, wherein the first application is provided to the first user as the recommendation when the first user is at the region over the geographical area at a particular time.

16. The non-transitory computer readable storage medium of claim 13, wherein the method further comprises:
providing the first application to the first user as the recommendation when the first user submits a search relating to the region over the geographical area.

17. The non-transitory computer readable storage medium of claim 13, wherein the region over the geographical area is defined as a polygon on a two dimensional map.

18. The non-transitory computer readable storage medium of claim 13, wherein the plurality of application usage records of the plurality of mobile devices are provided according to privacy rules of the plurality of mobile devices.

19. The non-transitory computer readable storage medium of claim 13 further comprising:
decimating the plurality of application usage records received from the plurality of mobile devices in space and time such that a resolution of the application usage records is reduced.

20. The non-transitory computer readable storage medium of claim 13 further comprising:
detecting a set of device population hotspots over the geographical area by:
determining an extrema of a population density of the plurality of mobile devices; and
identifying the extrema as the set of device population hotspots of the plurality of mobile devices.

21. The method according to claim 1, wherein the region comprises a spatio-temporal region comprising a physical location and a time associated with the physical location.

22. The method according to claim 1, wherein the request from the first user for the application that is locally relevant to the region is received after the first application is identified as locally relevant to the region over the geographical area.

* * * * *